(12) United States Patent
Vardi

(10) Patent No.: US 7,911,457 B2
(45) Date of Patent: *Mar. 22, 2011

(54) APPARATUS AND METHODS FOR HAND MOTION DETECTION AND HAND MOTION TRACKING GENERALLY

(75) Inventor: Micha Vardi, Raanana (IL)

(73) Assignee: I.C. + Technologies Ltd., Raunana (IL)

( * ) Notice: Subject to any disclaimer, the term of this patent is extended or adjusted under 35 U.S.C. 154(b) by 117 days.

This patent is subject to a terminal disclaimer.

(21) Appl. No.: 12/152,990

(22) Filed: May 19, 2008

(65) Prior Publication Data

US 2008/0260250 A1    Oct. 23, 2008

Related U.S. Application Data

(63) Continuation of application No. 10/964,998, filed on Oct. 14, 2004, now Pat. No. 7,394,460, which is a continuation of application No. 09/829,230, filed on Apr. 9, 2001, now Pat. No. 6,831,632.

(51) Int. Cl.
G09G 5/00 (2006.01)
(52) U.S. Cl. .................... 345/179; 178/19.01
(58) Field of Classification Search ............ 345/156, 345/158, 169, 173–179; 178/18.01, 18.1, 178/19.01; 382/181, 183–189, 312, 313
See application file for complete search history.

(56) References Cited

U.S. PATENT DOCUMENTS

| | | | |
|---|---|---|---|
| 3,983,535 A | 9/1976 | Herbst et al. | |
| 4,128,829 A | 12/1978 | Herbst et al. | 340/146.3 SY |
| 4,141,073 A | 2/1979 | Tan | |
| 4,142,175 A | 2/1979 | Herbst et al. | 340/146.3 SY |
| 4,345,239 A | 8/1982 | Elliott | |
| 4,513,437 A | 4/1985 | Chainer et al. | 382/3 |
| 4,695,831 A | 9/1987 | Shinn | 340/707 |
| 4,751,741 A | 6/1988 | Mochinaga et al. | |
| 4,787,051 A | 11/1988 | Olson | |
| 4,839,838 A | 6/1989 | LaBiche et al. | 364/709.11 |
| 5,077,802 A | 12/1991 | Plamondon | |
| 5,159,321 A | 10/1992 | Masaki et al. | 340/706 |
| 5,247,137 A | 9/1993 | Epperson | 178/18 |
| 5,294,792 A | 3/1994 | Lewis et al. | 250/221 |
| 5,301,222 A | 4/1994 | Fujiwara | |

(Continued)

FOREIGN PATENT DOCUMENTS

DE    10313019    10/2004

(Continued)

OTHER PUBLICATIONS

"Segment Matrix Vector Quantization and Fuzzy Logic for Isolated-Word Speech Recognition", Liusheng Liu et al., Institute of Microelectronics, Tsinghua University, Beijing, 100084, P.R. China, IEEE 1995, 0-8186-7118-1/95, pp. 152-156.

(Continued)

*Primary Examiner* — Regina Liang
(74) *Attorney, Agent, or Firm* — Vladimir Sherman; Professional Patent Solutions

(57) ABSTRACT

Apparatus and method for handwriting recognition including a hand-held device including at least one accelerometer providing an acceleration indicating output, computation circuitry receiving the acceleration indicating output and providing a velocity indicating output and a handwritten multiple character recognizer receiving the velocity indicating output and providing a multiple character recognition output indication.

48 Claims, 40 Drawing Sheets

U.S. PATENT DOCUMENTS

| | | | |
|---|---|---|---|
| 5,434,371 A | 7/1995 | Brooks | 178/18 |
| 5,453,758 A | 9/1995 | Sato | 345/158 |
| 5,517,579 A | 5/1996 | Baron et al. | 382/187 |
| 5,548,092 A | 8/1996 | Shriver | |
| 5,587,558 A | 12/1996 | Matsushima | 178/18 |
| 5,587,906 A | 12/1996 | McIver et al. | |
| 5,598,187 A | 1/1997 | Ide et al. | 345/158 |
| 5,615,132 A | 3/1997 | Horton et al. | |
| 5,781,661 A | 7/1998 | Hiraiwa et al. | 382/188 |
| 5,902,968 A | 5/1999 | Sato et al. | 178/19.01 |
| 5,926,567 A | 7/1999 | Collins et al. | |
| 5,981,884 A | 11/1999 | Sato et al. | 178/19.01 |
| 6,048,324 A | 4/2000 | Socci et al. | |
| 6,084,557 A | 7/2000 | Ishida et al. | 345/9 |
| 6,084,577 A | 7/2000 | Sato et al. | 345/179 |
| 6,101,280 A | 8/2000 | Reynolds | |
| 6,130,666 A | 10/2000 | Persidsky | 345/179 |
| 6,169,966 B1 | 1/2001 | Miura et al. | |
| 6,181,329 B1 | 1/2001 | Stork et al. | 345/179 |
| 6,188,392 B1 | 2/2001 | O'Connor et al. | 345/179 |
| 6,201,903 B1 | 3/2001 | Wolff et al. | 382/317 |
| 6,212,296 B1 | 4/2001 | Stork et al. | 382/188 |
| 6,229,102 B1 | 5/2001 | Sato et al. | 178/19.01 |
| 6,335,727 B1 | 1/2002 | Morishita et al. | 345/179 |
| 6,409,687 B1 | 6/2002 | Foxlin | |
| 6,415,223 B1 | 7/2002 | Lin et al. | |
| 6,421,622 B1 | 7/2002 | Horton et al. | |
| 6,487,421 B2 | 11/2002 | Hess et al. | |
| 6,625,314 B1 | 9/2003 | Okamoto | |
| 6,658,354 B2 | 12/2003 | Lin | |
| 6,691,074 B1 | 2/2004 | Moriya et al. | |
| 6,819,247 B2 | 11/2004 | Birnbach et al. | |
| 6,831,632 B2 * | 12/2004 | Vardi | 345/179 |
| 6,834,249 B2 | 12/2004 | Orchard | |
| 6,906,703 B2 | 6/2005 | Vablais et al. | |
| 6,956,564 B1 | 10/2005 | Williams | |
| 7,394,460 B2 * | 7/2008 | Vardi | 345/179 |
| 2002/0148655 A1 | 10/2002 | Cho et al. | |
| 2004/0236500 A1 | 11/2004 | Choi et al. | |
| 2005/0116045 A1 | 6/2005 | Chang | |
| 2006/0052109 A1 | 3/2006 | Ashman, Jr. et al. | |
| 2006/0146009 A1 | 7/2006 | Syrbe et al. | |
| 2006/0187204 A1 | 8/2006 | Yi et al. | |
| 2006/0255139 A1 | 11/2006 | Lee et al. | |
| 2006/0256082 A1 | 11/2006 | Cho et al. | |
| 2006/0258194 A1 | 11/2006 | Cho et al. | |
| 2007/0230747 A1 | 10/2007 | Dunko | |
| 2007/0232336 A1 | 10/2007 | Kim et al. | |
| 2007/0269083 A1 | 11/2007 | Haid | |
| 2008/0152202 A1 | 6/2008 | Moise et al. | |
| 2008/0229255 A1 | 9/2008 | Linjama et al. | |
| 2009/0017799 A1 | 1/2009 | Thorn | |
| 2009/0037849 A1 | 2/2009 | Immonen et al. | |
| 2009/0046056 A1 | 2/2009 | Rosenberg et al. | |
| 2009/0221332 A1 | 9/2009 | Bamberger et al. | |

FOREIGN PATENT DOCUMENTS

| | | |
|---|---|---|
| DE | 102004008254 | 9/2005 |
| EP | 0 691 623 | 10/1996 |
| EP | 1 133 753 | 6/2000 |
| EP | 1 104 143 | 5/2001 |
| GB | 2 219 119 | 11/1989 |
| GB | 2 347 593 | 9/2000 |
| JP | 4282717 | 10/1992 |
| JP | 6028096 | 2/1994 |
| JP | 7110737 | 4/1995 |
| JP | 2002082766 | 3/2002 |
| JP | 2003114754 | 4/2003 |
| WO | 94/09447 | 4/1994 |
| WO | 94/18663 | 8/1994 |
| WO | 95/21436 | 8/1995 |
| WO | 99/22338 | 5/1999 |
| WO | WO 99/48268 | 9/1999 |
| WO | WO 02/33528 | 4/2002 |
| WO | WO 2005/055568 | 6/2005 |

OTHER PUBLICATIONS

"Positron Emisssion Tomography [15O] Water Studies With Short Interscan Interval for Single-Subject and Group Analysis: Influence of Background Subtraction", Jolanta Chmielowska et al., Journal of Cerebral Blood Flow & Metabolism (1998) 18, 433-444; doi:Oct. 1997/00004647-199804000-00012.

"Ordinal Cost Sharing", Yves Sprumont, C.R.D.E and Departement de Sciences Economiques, Universite de Montreal, 3150 AvenueJean-Brillant, Montreal H3T 1N8, Canada, Journal of Economic Theory 81, 126-162 (1998), Article No. ET982408, Academic Press.

Verplaetse, "Inertial proprioceptive devices: Self-motionsensing toys and tools", IBM Systems Journal, vol. 35, Nos. 3.&4, 1996.

Oka et al., "Real-Time Fingertip Tracking and Gesture Recognition", IEEE Computer Graphics and Applications, 2002, 22(6), 24-38 (Abstract).

Welch et al., "Motion Tracking: No Silver Bullet, but a Respectable Arsenal", IEEE 2002, 0272-1716/02—Nov./Dec. 2002.

Rekimoto et al., PreSense: interaction techniques for finger sensing input devices, Proceedings of the 16th annual ACM symposium on User interface software and tech, 2003 (Abs).

Rekimoto et al.; SmartPad: finger-sensing keypad for mobile interaction, Conference on Human Factors in Computing Systems archive, CHI '03 extended abstracts on Human (Abs).

Liang et al., "Hand motion tracking using MDPF method", IEEE International Conference on Systems, Man and Cybernetics, 2005, 3, 2230-2235 (Abstract).

Hwang et al., "Requirements, Implementation and Applications of Hand-held Virtual Reality", The International Journal of Virtual Reality, 2006, 5(2):59-66.

Hwang et al., "Hand-held virtual reality: a feasibility study", Proceedings of the ACM symposium on Virtual reality software and technology, 2006, 356-363 (Abstract).

Bezdicek et al., "Portable absolute position tracking system for human hand fingertips", Proceedings of Virtual Concept, Cancun, Mexico; Nov. 27-Dec. 1, 2006.

Hannuksela et al., "Motion-based finger tracking for user interaction with mobile devices", 4th European conference on visual media production, 2007, 27(28), 1-6 (Abstract).

Yim et al., "Image Browsing in Mobile Device Using User Motion Tracking", International Symposium on Ubiquitous VR 2007.

Freesacle Semiconductor AN3397, "Implementing Positioning Algorithms Using Accelerometers" by Kurt Seifert and Oscar Camacho—Application Note—Rev 0, Feb. 2007.

IBM Technical Disclosure Bulletin, vol. 19, No. 7, Dec. 1976, pp. 2816-2817, "Electronic Calculator Based on Character Recognition of Input from Stylus Acceleration Dynamics".

Hideo Taguchi, et al., "On-line recognition of handwritten signatures by feature extraction of pen movement", Systems & Computers in Japan, Wiley, Hoboken, NJ, US, vol. 20, No. 10, Oct. 1989.

* cited by examiner

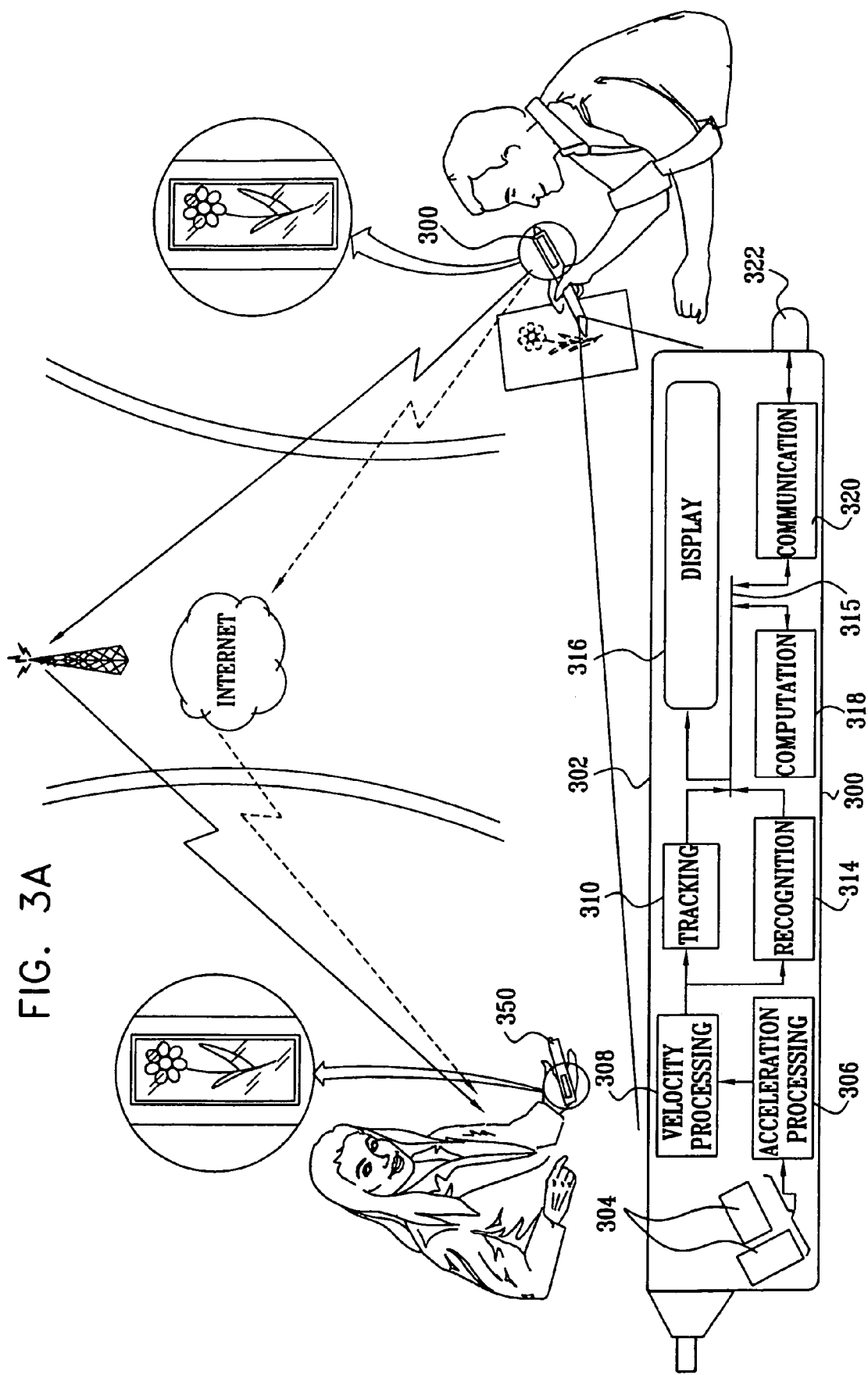

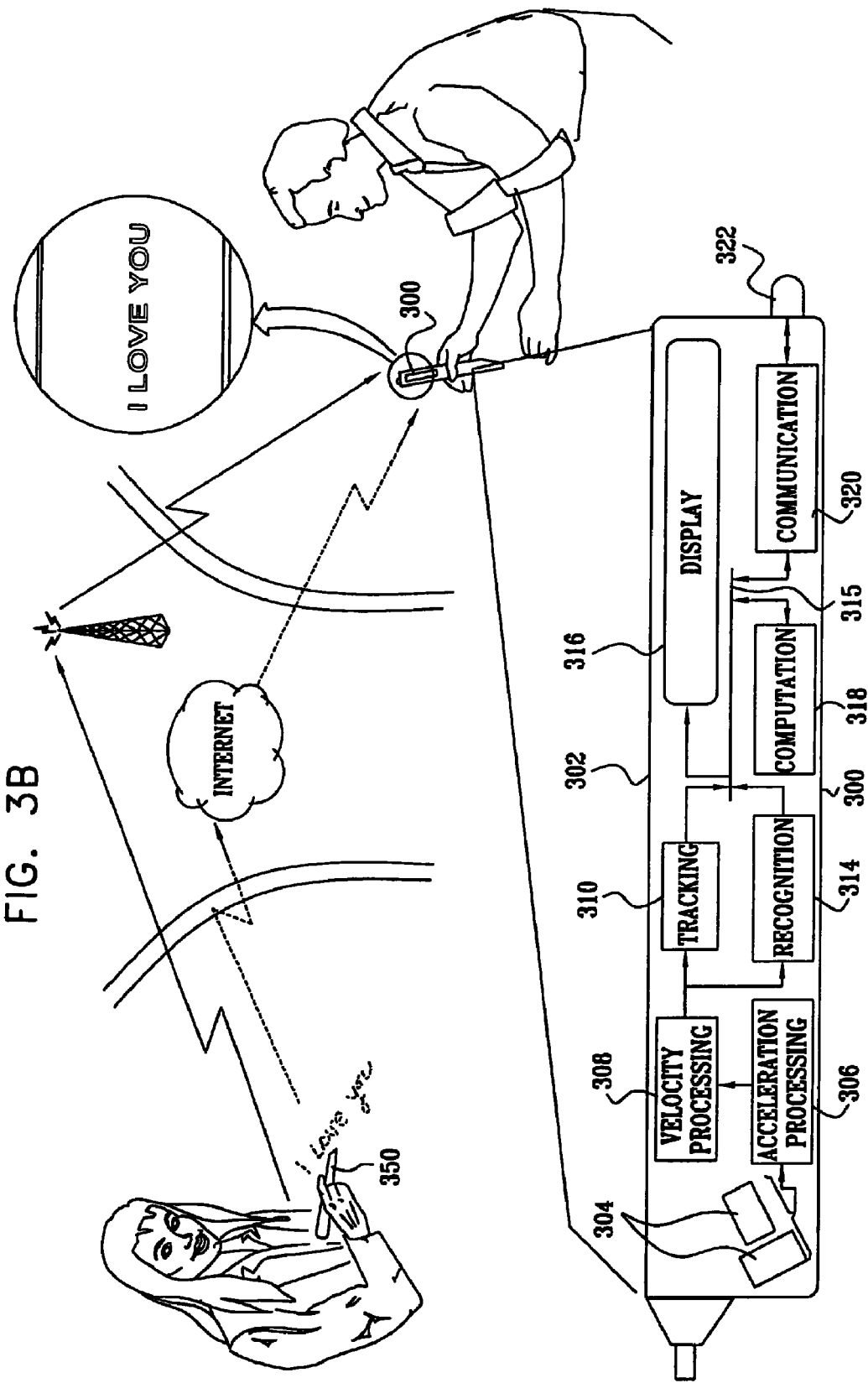

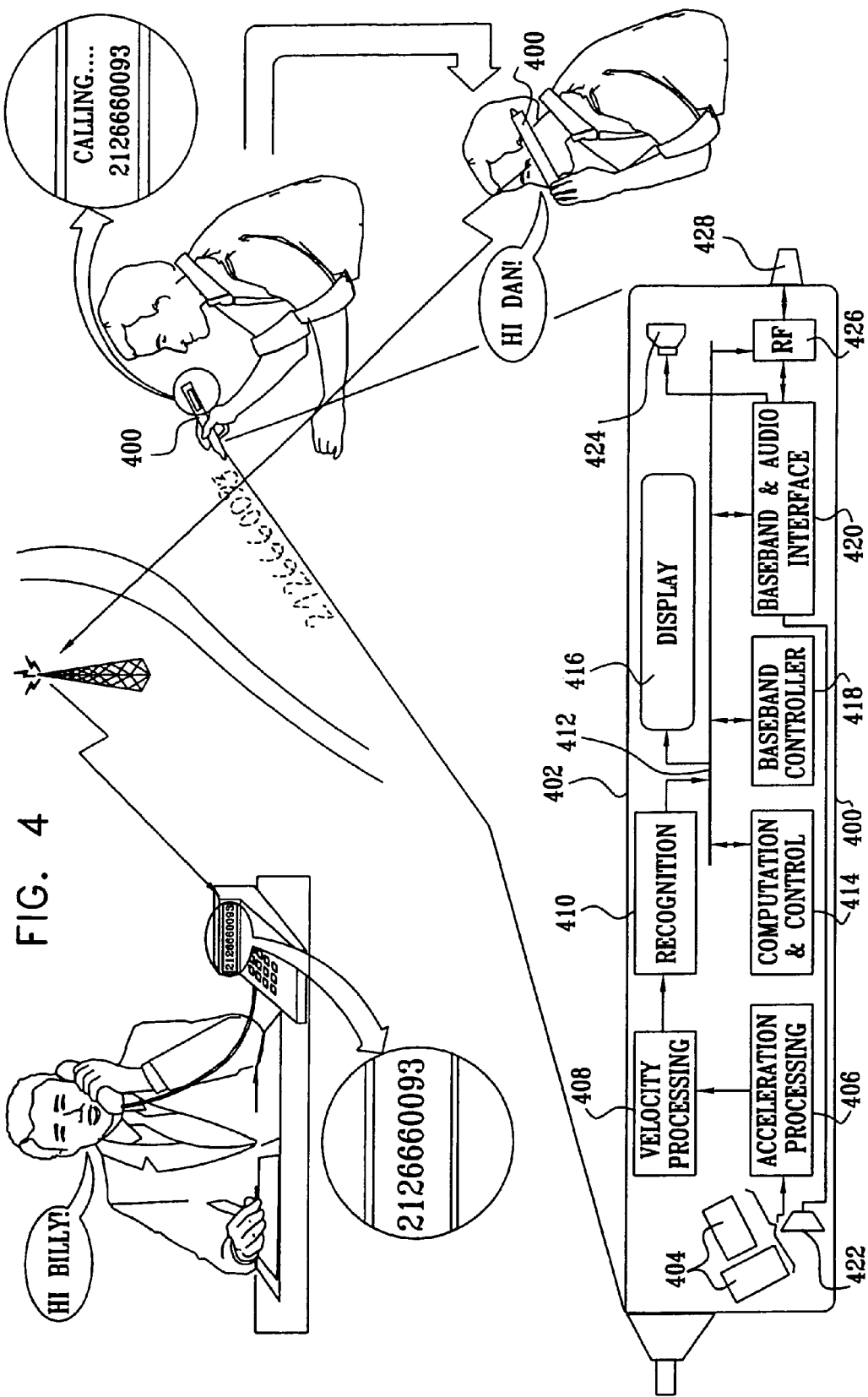

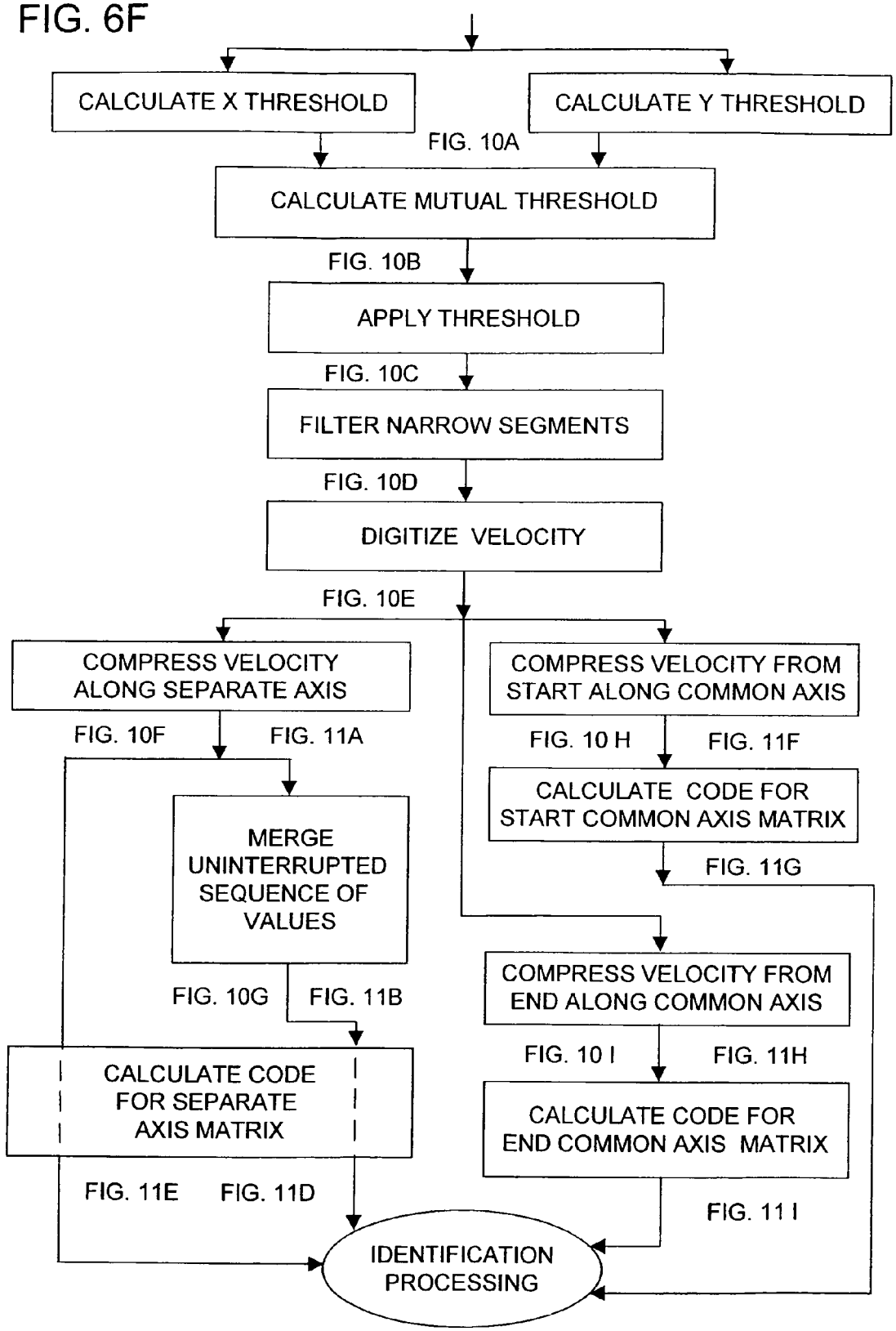

FIG. 11A  SEPARATE AXIS

| X | 0 | -1 | 0 | 1 | 0 | -1 | 0 | 1 | 0 | 0 | 0 | 0 |
| Y | 0 | -1 | 0 | -1 | 0 | 1 | 0 | 0 | 0 | 0 | 0 | 0 |

FIG. 11B  MERGED SEQUENCE

| X | 0 | -1 | 0 | 1 | 0 | -1 | 0 | 1 | 0 | 0 | 0 | 0 |
| Y | 0 | -1 | 0 | 1 | 0 | 1 | 0 | 0 | 0 | 0 | 0 | 0 |

X-MERGED: 0
Y-MERGED: 1

FIG. 11C

| SIGN | | | BINARY CODE | |
|---|---|---|---|---|
| N-1 | N | | N-1 | N |
| 0 | 0 | | 0 | 0 |
| 0 | 1 | | 0 | 1 |
| 0 | -1 | | 1 | 0 |

FIG. 11D  MERGED SEQUENCE - BINARY CODE

| X | 1 | 0 | 1 | 1 | 0 | 1 | 0 | 1 | 0 | 0 | 0 | 0 |
| Y | 1 | 0 | 0 | 1 | 0 | 0 | 0 | 0 | 0 | 0 | 0 | 0 |

X-MERGED: 0
Y-MERGED: 1

FIG. 11E  SEPARATE AXIS - BINARY CODE

| X | 0 | 1 | 0 | 1 | 0 | 1 | 0 | 1 | 0 | 0 | 0 | 0 |
| Y | 0 | 1 | 0 | 1 | 0 | 0 | 0 | 0 | 0 | 0 | 0 | 0 |

X-MERGED: 0
Y-MERGED: 0

FIG. 11F

START COMMON AXIS

| x | 0 | -1 | 1 | 1 | 1 | 0 | -1 | 0 | 0 | 1 | 0 | 0 | -1 | 0 | 0 | 0 | 0 |
|---|---|---|---|---|---|---|---|---|---|---|---|---|---|---|---|---|---|
| y | 0 | 0 | -1 | 0 | -1 | -1 | -1 | 0 | 1 | 1 | 1 | 0 | 0 | 0 | 0 | 0 | 0 |

FIG. 11G

START COMMON AXIS – BINARY CODE

| x | 1 | 0 | 0 | 1 | 1 | 0 | 0 | 1 | 0 | 0 | 1 | 0 | 0 | 1 | 0 | 0 | 0 |
|---|---|---|---|---|---|---|---|---|---|---|---|---|---|---|---|---|---|---|
| y | 0 | 0 | 1 | 0 | 1 | 1 | 1 | 0 | 0 | 1 | 1 | 1 | 0 | 0 | 0 | 0 | 0 |

ZEROS LENGTH

| 1 | 0 | 1 | ZEROS |
|---|---|---|---|
| 0 | 0 | 0 | AT END |

FIG. 11H

END COMMON AXIS

| x | 0 | 0 | -1 | -1 | 0 | 1 | 1 | 1 | 0 | -1 | -1 | 0 | 1 | 0 | 0 | -1 | 0 |
|---|---|---|---|---|---|---|---|---|---|---|---|---|---|---|---|---|---|
| y | 0 | 0 | 0 | -1 | -1 | -1 | 0 | 1 | -1 | -1 | 0 | 0 | 1 | 1 | 1 | 0 | 0 |

FIG. 11I

END COMMON AXIS – BINARY CODE

| x | 0 | 0 | 1 | 1 | 0 | 1 | 1 | 1 | 0 | 1 | 1 | 0 | 1 | 0 | 0 | 1 | 0 |
|---|---|---|---|---|---|---|---|---|---|---|---|---|---|---|---|---|---|---|
| y | 0 | 0 | 0 | 1 | 1 | 1 | 0 | 1 | 1 | 1 | 0 | 0 | 1 | 1 | 1 | 0 | 1 |

ZEROS LENGTH

| 1 | 0 | 1 | 0 | ZEROS |
|---|---|---|---|---|
| 0 | 0 | 0 | 1 | AT START |

MERGED SEQUENCE - BINARY CODE

| X | 1 | 0 | 0 | 1 | 1 | 0 | 0 | 0 | 1 | 1 | 0 | 0 | 0 | 0 | 0 | 0 |
|---|---|---|---|---|---|---|---|---|---|---|---|---|---|---|---|---|
| Y | 1 | 0 | 0 | 1 | 0 | 0 | 0 | 0 | 0 | 0 | 0 | 0 | 0 | 0 | 0 | 0 |

| X-MERGED | 1 |
|---|---|
| Y-MERGED | 1 |

FIG. 12A

SEPARATE AXIS - DICTIONARY

BINARY CODE

| X | 1 | 0 | 0 | 1 | 1 | 0 | 0 | 1 | 0 | 0 | 1 | 1 | 0 | 0 | 0 | 0 |
| --- | --- | --- | --- | --- | --- | --- | --- | --- | --- | --- | --- | --- | --- | --- | --- | --- |
| Y | 1 | 1 | 0 | 0 | 0 | 1 | 0 | 0 | 1 | 0 | 0 | 0 | 0 | 0 | 0 | 0 |

X-MERGED

| 0 | 0 |
| --- | --- |

Y-MERGED

CHARACTER IDENTIFICATION

| 0 | 0 | 0 |
| --- | --- | --- |
| 0 | 0 | 1 |

FIG. 12B

START COMMON AXIS - DICTIONARY STRUCTURE

BINARY CODE

| X | 1 | 0 | 1 | 1 | 1 | 0 | ••• | 1 | 0 |
| --- | --- | --- | --- | --- | --- | --- | --- | --- | --- |
| Y | 0 | 0 | 0 | 0 | 1 | 0 | ••• | 1 | 0 |

| MASK LENGTH | | | MASK POSITION |
| --- | --- | --- | --- |
| 1 | 0 | 0 | RIGHT |
| 0 | 0 | 0 | LEFT |

| 1 | 0 |
| --- | --- |
| 0 | 0 |

CHARACTER IDENTIFICATION

| 0 | 0 | 0 |
| --- | --- | --- |
| 0 | 0 | 1 |

FIG. 12C   START COMMON AXIS - MASK EXAMPLE

| X |  0 | -1 |  0 |  0 |  0 |  x |  x |  ... |  x |  x |  x |
|---|----|----|----|----|----|----|----|------|----|----|----|
| Y |  0 |  0.|  0 | -1 |  0 |  x |  x |  ... |  x |  x |  x |

FIG. 12D   START COMMON AXIS - DICTIONARY MASK EXAMPLE

BINARY CODE

| X | 1 | 0 | 1 | 1 | 1 | 0 | 0 | ... | 0 | 0 |
|---|---|---|---|---|---|---|---|-----|---|---|
| Y | 0 | 0 | 1 | 0 | 0 | 0 | 0 | ... | 0 | 0 |

MASK LENGTH

| 1 | 1 |
|---|---|
| 1 | 0 |

MASK POSITION

| 1 | RIGHT |
|---|-------|
| 0 | LEFT  |

CHARACTER IDENTIFICATION

| 1 | 1 |
|---|---|
| 0 | 0 |

APPARATUS AND METHODS FOR HAND MOTION DETECTION AND HAND MOTION TRACKING GENERALLY

This is a continuation application number 10/964,998 now U.S. Pat. No. 7,394,460 filed on Oct. 14, 2004, which is a continuation of application Ser. No. 09/829,230 filed on Apr. 9, 2001 (now U.S. Pat. No. 6,831,632), claims the benefit thereof and incorporates the same by reference.

FIELD OF THE INVENTION

The present invention relates to apparatus and methods for hand motion detection and handwriting recognition generally.

BACKGROUND OF THE INVENTION

The following U.S. Patents are believed to represent the current state of the art: U.S. Pat. Nos. 5,159,321; 5,247,137; 5,294,792; 5,434,371; 5,453,758; 5,517,579; 5,587,558; 5,598,187; 5,781,661; 5,902,968; 5,981,884; 6,084,557; 6,130,666;

The following PCT International Publications are believed to represent the current state of the art: WO 94/09447; WO 94/18663; WO 95/21436; WO 99/22338;

SUMMARY OF THE INVENTION

The present invention seeks to provide improved apparatus and methods for hand motion detection and handwriting recognition as well as hand held computing and communication devices employing such apparatus and methods.

There is thus provided in accordance with a preferred embodiment of the present invention an apparatus for handwriting recognition including a hand-held device including at least one accelerometer providing an acceleration indicating output, computation circuitry receiving the acceleration indicating output and providing a velocity indicating output and a handwritten multiple character recognizer receiving the velocity indicating output and providing a multiple character recognition output indication.

There is also provided in accordance with a preferred embodiment of the present invention an apparatus for handwriting recognition including a hand-held device including at least one accelerometer providing an acceleration indicating output, computation circuitry receiving the acceleration indicating output, discarding user specific components therein and providing a non-user specific output and a handwritten character recognizer receiving the non-user specific output and providing a character recognition output indication.

There is further provided in accordance with a preferred embodiment of the present invention an apparatus for hand motion tracking including a handheld device including at least one accelerometer providing an acceleration indicating output, computation circuitry receiving the acceleration indicating output and providing a proportionally normalized velocity indicating output and a hand motion tracker receiving the velocity indicating output and providing a tracking output indication.

There is further provided in accordance with another preferred embodiment of the present invention an apparatus for hand motion tracking including a hand-held device including at least one accelerometer providing an acceleration indicating output, computation circuitry receiving the acceleration indicating output, discarding user specific components therein and providing a non-user specific output and a hand motion tracker receiving the non-user specific output and providing a tracking output indication.

There is also provided in accordance with yet another preferred embodiment of the present invention an apparatus for handwriting recognition and hand motion tracking including a hand-held device including at least one accelerometer providing an acceleration indicating output, computation circuitry receiving the acceleration indicating output and providing a velocity indicating output, a handwritten character recognizer receiving the velocity indicating output and providing a multiple character recognition output indication and a hand motion tracker receiving the velocity indicating output and providing a tracking output indication.

There is also provided in accordance with a preferred embodiment of the present invention an apparatus for handwriting recognition and hand motion tracking including a hand-held device including at least one accelerometer providing an acceleration indicating output, computation circuitry receiving the acceleration indicating output, discarding user specific components therein and providing a non-user specific output, a handwritten character recognizer receiving the non-user specific output and providing a character recognition output indication and a hand motion tracker receiving the non-user specific output and providing a tracking output indication.

There is also provided in accordance with yet a further preferred embodiment of the present invention a pen computer including a hand-held device including at least one accelerometer providing an acceleration indicating output, computation circuitry located within the hand-held device and receiving the acceleration indicating output and providing a non-user specific output, a handwritten character recognizer located within the hand-held device and receiving the non-user specific output and providing a character recognition output indication and a computer located within the hand-held device for receiving the character recognition output indication as performing computer operations in response thereto.

There is further provided in accordance with a preferred embodiment of the present invention a pen communicator including a hand-held device including at least one accelerometer providing an acceleration indicating output, computation circuitry located within the hand-held device and receiving the acceleration indicating output and providing a proportionally normalized velocity indicating output, a handwritten character recognizer located within the hand-held device and receiving the proportionally normalized velocity indicating output and providing a character recognition output indication, and a communication device located within the hand-held device for receiving the character recognition output indication and performing communication operations in response thereto.

Further in accordance with a preferred embodiment of the present invention the accelerometer includes a plurality of accelerometers providing outputs to acceleration processing circuitry, which provides the acceleration indicating output.

Still further in accordance with a preferred embodiment of the present invention the computation circuitry is also operable to perform at least one of Calculator, Database, Personal Information Management (PIM) and Personal Digital Assistant (PDA) functionalities, including at least one of address and phone book, data-bank, calendar, time management, calculator, expenses tracking and management, "to do list" management, note and memo taking, dictionary, translator and speller, smart-card, magnetic card, credit-card, electronic-wallet, remote-control and smart key functionalities and to provide a computation output resulting therefrom.

Further in accordance with a preferred embodiment of the present invention the apparatus for handwriting recognition also includes communication circuitry.

Preferably, the communication circuitry provides functionality for at least one of a telephone, paging, SMS, WAP, Email, Internet browsing and POTS functions.

Additionally in accordance with a preferred embodiment of the present invention the apparatus for handwriting recognition also includes at least one of a microphone, a speaker, an earphone, an audio interface, an audio processor, a digital signal processor, a display, an image processor, a control circuitry, a CPU, a MPU, a memory, a transceiver, an antenna, a baseband controller, a baseband interface, an Input/Output port, a wireless port, a Bluetooth output, an infra-red port, a serial port, a USB port and data acquisition circuitry.

Further in accordance with a preferred embodiment of the present invention the apparatus is employed as a writing implement.

Still further in accordance with a preferred embodiment of the present invention the computation circuitry provides at least one of proportional normalization of velocity, identifies minimum motion points, normalizes at least a portion of the acceleration indicating output to a level of an average of a first few samples of the acceleration indicating output, and determining a last intentional motion sample of the acceleration indicating output and eliminates samples following the last intentional motion sample of the acceleration indicating output.

Additionally in accordance with a preferred embodiment of the present invention the apparatus for handwriting recognition provides a multiple character recognition output indication which includes at least one of: compressing the velocity indicating output, separately analyzing information for the x and y velocity components, analyzing the directions of the velocity, calculating velocity thresholds, digitizing velocity components, comparing and matching between a digital dictionary and a digitized velocity record and using only part of the digitized velocity record, comparing and matching between a digital dictionary and a few different representation forms of digitized velocity using a prioritization procedure which takes place in case of disagreement between different comparing and matching results, filtering out short duration segments of the velocity components, indicating velocity value changes and ignoring time durations between the changes, performing a merger operation on velocity segments and binarizing velocity segments.

Further in accordance with a preferred embodiment of the present invention the hand motion tracker provides at least one of a three-dimensional tracking output indication, a two-dimensional tracking output indication and a character tracking output indication.

There is further provided in accordance with a preferred embodiment of the present invention a method for handwriting recognition. The method includes providing an acceleration indicating output from a hand-held device, receiving the acceleration indicating output and providing a velocity indicating output, and receiving the velocity indicating output and providing a multiple character recognition output indication.

Further in accordance with a preferred embodiment of the present invention the method also includes at least one of a computation related to the character recognition output indication, a database operation related to the character recognition output indication, communication of character recognition output indication and a control operation based on the character recognition output indication.

Still further in accordance with a preferred embodiment of the present invention the velocity indicating output is further proportionally normalized.

Additionally in accordance with a preferred embodiment of the present invention the method also includes normalizing at least a portion of the acceleration indicating output to a level of the average of the first few samples of the acceleration indicating output.

Further in accordance with a preferred embodiment of the present invention the method further includes determining a last intentional motion sample of the acceleration indicating output and eliminating samples following the last intentional motion sample of the acceleration indicating output.

Preferably determining of the last intentional motion sample includes examining a record of the output of at least one of the acceleration sensors in order to determine the average of the last few samples, thereafter, examining the record sequentially from the last few samples backwards in time direction until a variation from the average of at least a predetermined magnitude is encountered and determining a time location of this variation to be the time location of the last intentional motion.

Further in accordance with a preferred embodiment of the present invention the method of providing a velocity indicating output further includes identification of minimum motion points.

Still further in accordance with a preferred embodiment of the present invention the method also includes providing a multiple character recognition output indication includes compressing the velocity indicating output.

Additionally in accordance with a preferred embodiment of the present invention the method further includes providing a multiple character recognition output indication and includes separately analyzing information for the X and Y velocity components, Further in accordance with a preferred embodiment of the present invention the method also includes providing a multiple character recognition output indication includes analyzing directions of the velocity.

Still further in accordance with a preferred embodiment of the present invention the method includes providing a multiple character recognition output indication and includes comparing and matching between a digital dictionary and digitized velocity record using only part of the digitized velocity.

Alternatively the providing a multiple character recognition output indication includes comparing and matching between a digital dictionary and a few different representation forms of digitized velocity using a prioritization procedure which takes place in case of disagreement between different comparing and matching results.

Further in accordance with a preferred embodiment of the present invention the method further includes at least one of filtering out short duration segments of the velocity components, performing a merger operation on velocity segments and binarizing operation on velocity segments.

Still further in accordance with a preferred embodiment of the present invention the method also includes providing a multiple character recognition output indication includes calculating velocity thresholds.

Preferably calculating of velocity thresholds further includes dependency of the thresholds on the minimum and maximum values of the velocity components.

Further in accordance with a preferred embodiment of the present invention the method includes digitizing velocity components to provide digitized information.

Preferably the method also includes analyzing the digitized information for the velocity components to detect value changes therein, indicating each such change and ignoring time durations between changes.

There is also provided in accordance with another preferred embodiment of the present invention a method for handwriting recognition. The method includes providing an acceleration indicating output from a hand-held device, receiving the acceleration indicating output, discarding user specific components therein and providing a non-user specific output and receiving the non-user specific output and providing a character recognition output indication.

There is also provided in accordance with a preferred embodiment of the present a method for hand motion tracking. The method includes providing an acceleration indicating output from a hand-held device, receiving the acceleration indicating output and providing a proportionally normalized velocity indicating output and receiving the velocity indicating output and providing a tracking output indication.

Further in accordance with a preferred embodiment of the present invention the method also includes providing a tracking indicating output includes at least one of representing a multi-dimensional object, representing drawing in the air, representing drawing in on a surface, representing a character tracking in the air, and representing a character tracking on a surface.

Still further in accordance with a preferred embodiment of the present invention the method further includes indicating at least one of a computation based on the tracking output, operating a database on the tracking output indication, indicating communication of tracking output and a control operations based on the tracking output indications.

Additionally in accordance with a preferred embodiment of the present invention the method also includes normalizing at least a portion of the acceleration indicating output to a level of the average of the first few samples of the acceleration indicating output.

Further in accordance with a preferred embodiment of the present invention the method further includes determining the last intentional motion sample of the acceleration indicating output and eliminating samples following the last intentional motion sample of the acceleration indicating output, Still further in accordance with a preferred embodiment of the present invention, determining of the last intentional motion sample includes examining a record of the output of at least one of the acceleration sensors in order to determine the average of the last few samples, thereafter, examining the record sequentially from the last few samples backwards in time direction until a variation from the average of at least a predetermined magnitude is encountered and determining a time location of this variation to be the time location of the last intentional motion.

Further in accordance with a preferred embodiment of the present invention the method also provided a velocity indicating output further includes identification of minimum motion points.

There is further provided in accordance with a preferred embodiment of the present invention a method for hand motion tracking. The method includes providing an acceleration indicating output from a hand-held device, receiving the acceleration indicating output, discarding user specific components therein and providing a non-user specific output and receiving the non-user specific output and providing a tracking output indication.

There is further provided in accordance with a preferred embodiment of the present invention a method for handwriting recognition and hand motion tracking. The method includes providing an acceleration indicating output from a hand-held device, receiving the acceleration indicating output and providing a velocity indicating output, receiving the velocity indicating output and providing a multiple character recognition output indication and receiving the non-user specific output and providing a character recognition output indication.

There is further provided in accordance with a preferred embodiment of the present invention a method for handwriting recognition and hand motion tracking. The method includes providing an acceleration indicating output from a hand-held device, receiving the acceleration indicating output, discarding user specific components therein and providing a non-user specific output and receiving the non-user specific output and providing a character recognition output indication.

BRIEF DESCRIPTION OF THE DRAWINGS

The present invention will be understood and appreciated more fully from the following detailed description, taken in conjunction with the drawings in which:

FIGS. 3A & 3B are together a simplified partially pictorial, partially block diagram illustration of handwriting recognition and hand motion tracking apparatus constructed and operative in accordance with a preferred embodiment of the present invention;

FIG. 4 is a simplified partially pictorial, partially block diagram illustration of a telephone employing handwriting recognition and hand motion tracking apparatus constructed and operative in accordance with a preferred embodiment of the present invention;

FIGS. 6A, 6B, 6C, 6D, 6E, 6F, 6G, 6H & 6I are flow charts, illustrating some of the functionalities of FIG. 5;

FIGS. 11A, 11B, 11C, 11D, 11E, 11F, 11G, 11H, 11I 11J and 11K, are diagrams which are useful in the understanding of the functionality shown in FIGS. 6F & 6G; and FIGS. 12A, 12B, 12C & 12D are diagrams which are useful in the understanding of the functionality shown in FIGS. 6F, 6G, 6H & 6I;

DETAILED DESCRIPTION OF PREFERRED EMBODIMENTS

Figure 1:
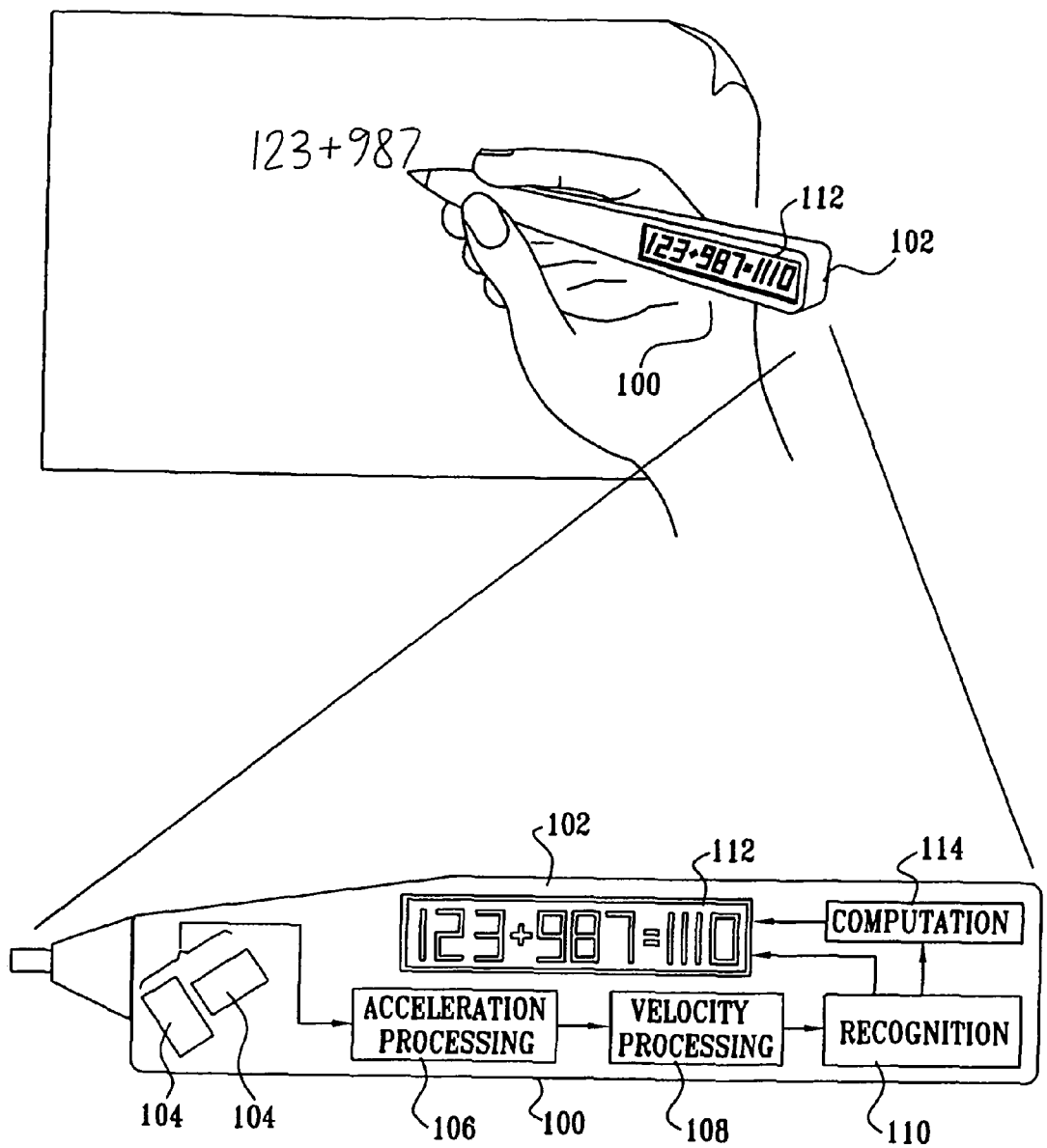
FIG. 1 is a simplified partially pictorial, partially block diagram illustration of handwriting recognition apparatus constructed and operative in accordance with a preferred embodiment of the present invention.

Reference is now made to FIG. 1, which is a simplified partially pictorial, partially block diagram illustration of handwriting recognition apparatus constructed and operative in accordance with a preferred embodiment of the present invention. As seen in FIG. 1, there is provided apparatus for handwriting recognition, generally designated by reference numeral 100 and including a hand-held housing 102, typically formed of molded plastic and including therewithin at least one and preferably plural mutually orthogonal arranged accelerometers 104 providing outputs to an acceleration processing circuitry 106 which, in turn, preferably outputs to velocity processing circuitry 108, which provides a velocity indicating output.

A recognition circuitry 110, such as a handwriting character recognizer, receives the velocity indicating output from circuitry 108 and preferably provides a character recognition output indication. It is a particular feature of the present invention that a velocity indicating output is provided and employed for downstream recognition. The character recognition output indication is preferably supplied to a display 112, such as a LCD display, which is viewable by a user.

Additionally in accordance with a preferred embodiment of the present invention, computation circuitry 114 is provided and receives the character recognition output indication from circuitry 110. Computation circuitry 114 is preferably operable to perform mathematical functions, such as arithmetic functions, as illustrated based on inputs received from circuitry 110. Computation circuitry 114 preferably is operable to provide a computation output via display 112. Computation circuitry 114 may also be enabled to perform any other suitable type of computation, including for example, computations useful in Personal Information Management functionality.

Figure 2:
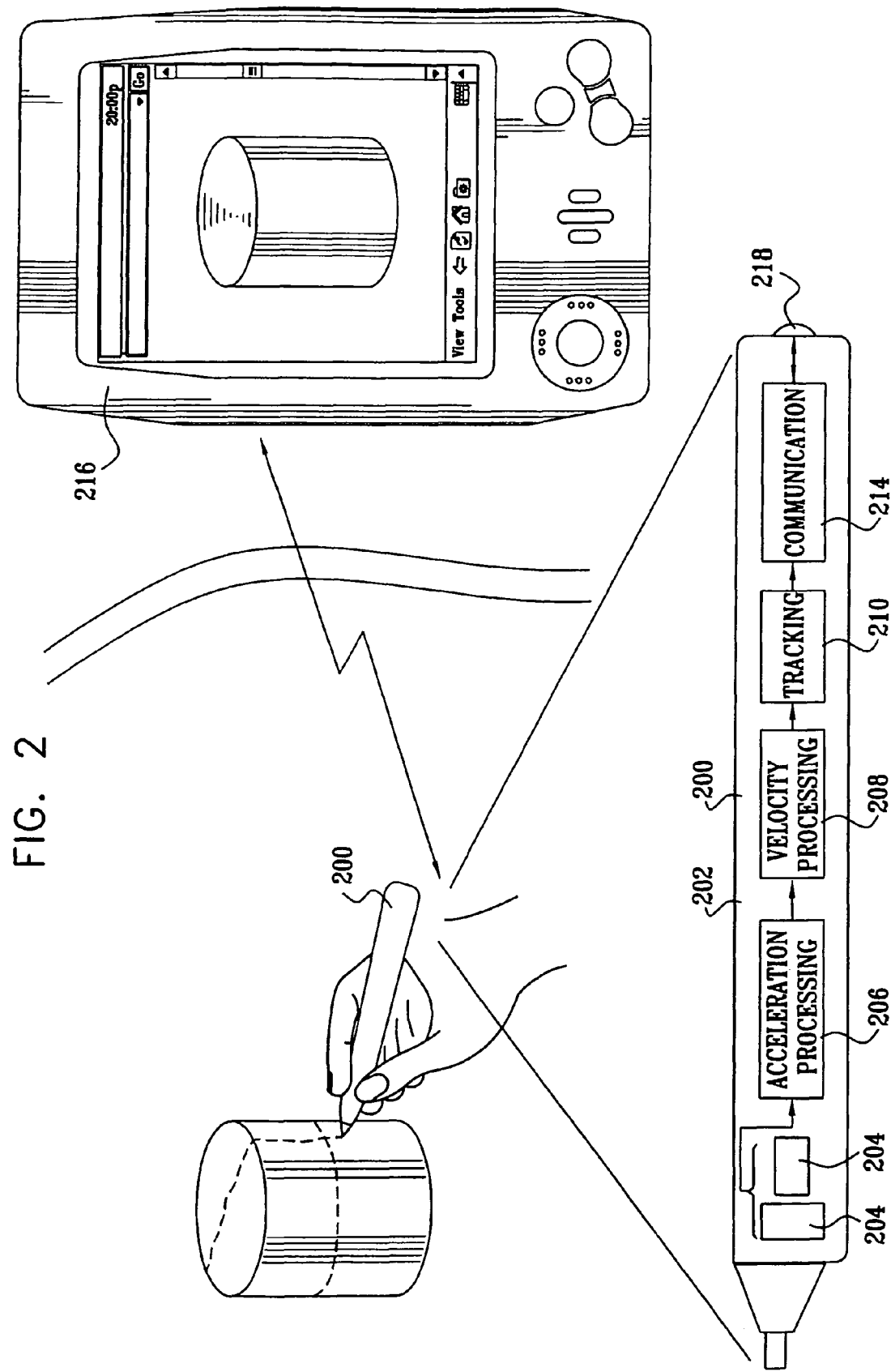
FIG. 2 is a simplified partially pictorial, partially block diagram illustration of hand motion tracking apparatus constructed and operative in accordance with a preferred embodiment of the present invention.

Reference is now made to FIG. 2, which is a simplified partially pictorial, partially block diagram illustration of hand motion tracking apparatus constructed and operative in accordance with a preferred embodiment of the present invention. As seen in FIG. 2, there is provided apparatus for hand motion tracking, generally designated by reference numeral 200 and including a hand-held housing 202, typically formed of molded plastic and including therewithin at least one and preferably plural mutually orthogonal arranged accelerometers 204 providing outputs to acceleration processing circuitry 206 which, in turn, preferably outputs to velocity processing circuitry 208, which provides a velocity indicating output.

Tracking circuitry 210 receives the velocity indicating output from circuitry 208 and preferably provides a three-dimensional tracking output indication. Preferably, the three-dimensional output may be employed by a suitable output device.

Alternatively, the output of tracking circuitry 210 may be supplied to 3D-2D tracking output indication conversion circuitry or, as a further alternative, tracking circuitry 210 may provide a two-dimensional output. Preferably, the three-dimensional output may be employed by a suitable output device.

It is a particular feature of the present invention that a velocity indicating output is provided and employed for downstream tracking. The output of tracking circuitry 210 is supplied either directly or via 3D-2D tracking output indication conversion circuitry (not shown) to communication circuitry 214 which preferably provides a wireless communication output to a remote output device, such as, for example, a personal digital assistant 216.

It is appreciated that communication circuitry 214 may be any suitable communication circuitry and may provide wired or wireless transmission via a suitable antenna 218. A preferred type of communication is wireless Bluetooth communication, it being understood, however, that any suitable alternative thereto is also contemplated hereby, including, inter alia relatively long range communication.

As seen in FIG. 2, a three dimensional object can typically be represented simply by tracing one or more features of the outline thereof using the apparatus 200.

Reference is now made to FIGS. 3A & 3B, which are together a simplified partially pictorial, partially block diagram illustration of handwriting recognition and hand motion tracking apparatus constructed and operative in accordance with a preferred embodiment of the present invention. As seen in FIGS. 3A & 3B, there is provided apparatus for hand motion tracking and handwriting recognition, generally designated by reference numeral 300 and including a hand-held housing 302, typically formed of molded plastic and including therewithin at least one and preferably plural mutually orthogonal arranged accelerometers 304 providing outputs to acceleration processing circuitry 306 which, in turn, preferably outputs to velocity processing circuitry 308, which provides a velocity indicating output.

Tracking circuitry 310 receives the velocity indicating output from circuitry 308 and preferably provides a three-dimensional tracking output indication. Alternatively, tracking circuitry 310 may provide a two-dimensional output. As a further alternative, the three-dimensional output may be employed by any suitable output device. The output from the tracking circuitry 310 may be displayed or transmitted to another communication device and also used for handwriting recognition, as descried hereinbelow.

It is a particular feature of the present invention that a velocity indicating output is provided and employed for downstream tracking.

In addition to tracking circuitry 310, there is also preferably provided recognition circuitry 314, such as a handwriting character recognizer, receives the velocity indicating output from circuitry 308 and preferably provides a character recognition output indication. It is a particular feature of the present invention that a velocity indicating output is provided and employed for downstream recognition. The character recognition output indication is preferably supplied to a display 316, such as an LCD display, which is viewable by a user.

Additionally in accordance with a preferred embodiment of the present invention, computation circuitry 318 is provided and receives the character recognition output indication from circuitry 314 via a bus 315. Computation circuitry 318 is preferably operable to perform mathematical functions, such as arithmetic functions and personal organizer functions as illustrated based on inputs received from circuitry 314. Computation circuitry 318 preferably is operable to provide a computation output via the bus 315 to the display 316 and to the communication circuitry 320. Computation circuitry 318 may also be enabled to perform any other suitable type of computation and to have database and Personal Digital Assistant functionality.

In accordance with a preferred embodiment of the present invention, the output of tracking circuitry 310 is supplied either directly or via 3D-2D tracking output indication conversion circuitry (not shown) to communication circuitry 320, along with the output of one or both of computation circuitry 318 and recognition circuitry 314. Communication circuitry 320 preferably provides a wireless communication output via an antenna 322 or other suitable communication port to a remote output device, such as, for example, a similar device 350 or any other suitable output device. It is appreciated that communication circuitry 320 may be any suitable communication circuitry and may provide wired or wireless transmission. A preferred type of communication is at least partially wireless telephone or IP communication, it being understood, however, that any suitable alternative thereto is also contemplated hereby.

As seen in FIG. 3A, a user can represent three dimensional objects such as flowers simply by tracing one or more features of the outline thereof or drawing them in the air or on a substrate using the apparatus 300. The representation of the three dimensional image, typically in two-dimensional form, may be sent to a similar output device 350 at a remote location, as illustrated, where it may be viewed on the display 316 of that device.

As seen in FIG. 3B, the user of the remote apparatus 350 may, in response to receipt of the representation of the three dimensional image, transmit a response back to the sender. In the illustrated case, the response is a handwritten message, transmitted wirelessly to the original sending user and appearing on display 316 of his apparatus 300.

Reference is now made to FIG. 4, which is a simplified partially pictorial, partially block diagram illustration of a hand-held communicator, such as a telephone employing handwriting recognition and hand motion tracking apparatus constructed and operative in accordance with a preferred embodiment of the present invention. As seen in FIG. 4, there is provided a hand-held communicator, such as a telephone, generally designated by reference numeral 400 and preferably including apparatus for hand motion tracking and handwriting recognition located within a hand-held housing 402. Housing 402 is preferably formed of molded plastic and includes therewithin at least one and preferably plural mutually orthogonal arranged accelerometers 404 providing outputs to acceleration processing circuitry 406 which, in turn, preferably outputs to velocity processing circuitry 408, which provides a velocity indicating output.

Recognition circuitry 410, such as a handwriting character recognizer, preferably receives the velocity indicating output from circuitry 408 and preferably provides a character recognition output indication. It is a particular feature of the present invention that a velocity indicating output is provided to circuitry 410 and employed for downstream recognition therein. The character recognition output indication from circuitry 410 is preferably supplied via a bus 412 to computation and control circuitry 414, a baseband controller 418 and to a display 416, such as an LCD display, which is viewable by a user.

Computation and control circuitry 414 is preferably operable to perform mathematical functions, such as arithmetic functions and personal organizer functions, as illustrated based on inputs received from circuitry 410. Computation and control circuitry 414 preferably is operable to provide a computation output via display 416 and the bus 412. Computation and control circuitry 414 may also be enabled to perform any other suitable type of computation, database or Personal Digital Assistant functionality.

Conventional cellular telephone functionality may be provided by computation and control circuitry 414, baseband controller 418 and a baseband and audio interface 420. Interface 420 typically interfaces with a microphone 422 and a speaker 424 as well as with a conventional RF transceiver 426. The RF transceiver 426 transmits and receives via a suitable antenna 428. It is noted that the output of recognition circuitry 410 may be employed for dialing, as pictorially illustrated in FIG. 4, typically by supplying an output from recognition circuitry 410 via baseband controller 418 to the RF transceiver 426 that transmits via the antenna 428.

It is a particular feature of the embodiment of FIG. 4 that the output of recognition circuitry 410 and possibly of computation and control circuitry 414 may be used as a dialing input for a telephone. It is thus appreciated, that, as illustrated in FIG. 4, a user may dial the telephone by writing in the air or on any substrate using the telephone as a writing implement.

It is appreciated that the communicator 400 may be any suitable type of communicator and may provide wired or wireless transmission. A preferred type of communication is at least partially wireless telephone or IP telephony communication, it being understood, however, that any suitable alternative thereto is also contemplated hereby.

Figure 5:
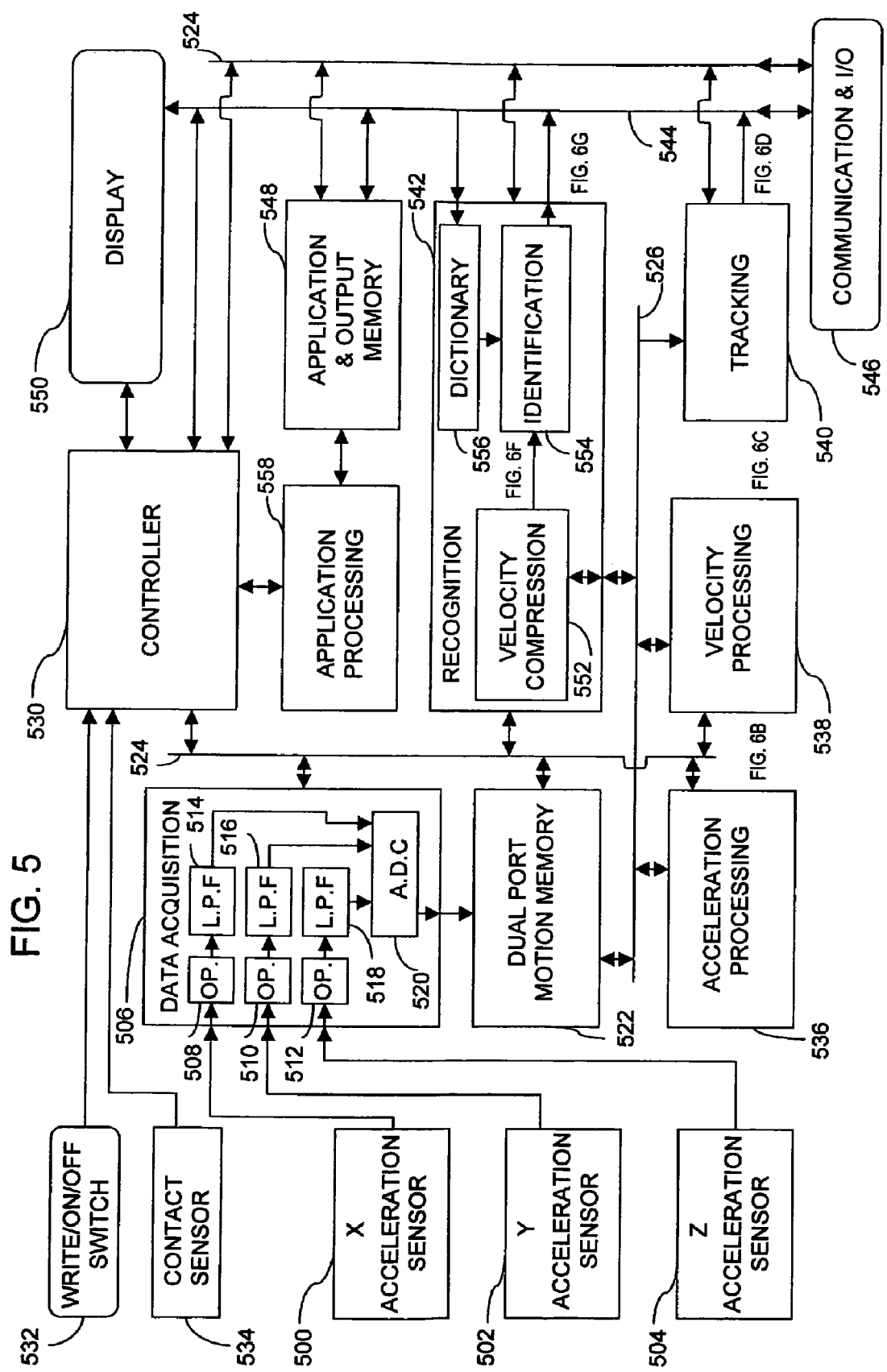
FIG. 5 is a simplified functional block diagram illustration of functionalities of the apparatus of FIGS. 1, 2, 3A, 3B & 4.

Reference is now made to FIG. 5, which is a simplified functional block diagram illustration of a preferred embodiment of the present invention showing the functionalities of the apparatus of FIGS. 1, 2, 3A, 3B & 4. It is appreciated that in any given application some of the functionalities described hereinbelow, with respect to FIG. 5, may not be needed and thus may not be present.

As seen in FIG. 5, preferably three accelerometers, operating as respective X, Y and Z acceleration sensors, respectively designated by reference numerals 500, 502 and 504, preferably output to data acquisition circuitry 506. Data acquisition circuitry 506 preferably includes operational amplifiers 508, 510 and 512, receiving the outputs of acceleration sensors 500, 502 and 504 respectively and providing outputs via respective low pass filters 514, 516 and 518 to an A-D converter 520. It is appreciated that digital acceleration sensors, providing a DCM (Duty Cycle Modulated signal) output may be employed instead of sensors providing analog outputs. In such a case, the A-D converter 520 is obviated and other aspects of the data acquisition circuitry 506 may be changed accordingly.

The output of the A-D converter 520 is preferably supplied to a dual port motion memory 522 which communicates via a control bus and a data bus, here respectively designated by reference numerals 524 and 526.

A controller 530, which typically receives inputs from a write/on/off switch 532 and a contact sensor 534, provides control inputs via the control bus 524 to the data acquisition circuitry 506, to the dual port motion memory 522 and to acceleration processing circuitry 536, which receives a data output from dual port motion memory 522 via the data bus 526. Controller 530 may also provide a power management function for the remainder of the circuitry of FIG. 5, which may include power savings when a sensed activity level is below a useful level due to the absence of intentional hand motion.

The acceleration processing circuitry 536 provides an output to velocity processing circuitry 538 preferably via data bus 526 and the dual port motion memory 522. Velocity processing circuitry 538 also receives a control input preferably from controller 530 via control bus 524.

The output of velocity processing circuitry 536 is preferably supplied via data bus 526 to tracking circuitry 540 and to recognition circuitry 542, both of which also receive control inputs from controller 530 preferably via control bus 524. The tracking circuitry 540 preferably provides an output via an output bus 544 to communication and Input/output circuitry 546, application and output memory 548 and display 550.

Recognition circuitry 542 preferably comprises velocity compression circuitry 552 which receives data and control inputs from respective data and control busses 526 and 524 and which provides an output to identification circuitry 554. Identification circuitry 554 typically also receives a data input from a dictionary database 556 and a control input from control bus 524. Identification circuitry 554 also preferably outputs via output bus 544 to communication and Input/Output circuitry 546, to application and output memory 548 and to display 550.

Controller 530 preferably cooperates with application processing circuitry 558, such as circuitry which provides Personal Information Management (PIM) and Personal Digital Assistant (PDA) circuitry including at least one of address and phone book, data-bank, calendar, time management, calculator, expenses tracking and management, "to do list" management, note and memo taking, dictionary, translator and speller functionalities. It may also provide one or more of smart-card, magnetic card, credit-card, electronic-wallet, remote-control and smart key functionalities. When combined with a communication functionality, it may serve for editing, browsing, receiving and sending, uni- and bi-directional paging, SMS, WAP, Email, POTS and other types of communications. Circuitry 558 preferably which interfaces with application and output memory 548, which in turn communicates via output bus 544 and control bus 524, as does controller 530 and a display 550, which is coupled to controller 530.

Communication and input/output circuitry 546 may handle wireless port, infra-red port, serial port, USB port and any other suitable type of communication. It preferably interfaces with the controller 530 via the control bus 524 and output bus 544, exchanges data with application and output memory 548 and sends data to display 550, via output bus 544. A wireless embodiment of the communication circuitry 546 appears in FIG. 4.

It is appreciated that there may be other architectures, memory organizations, processing schemes and buses structures which also implement the functionalities shown in FIG. 5.

Figure 6A:
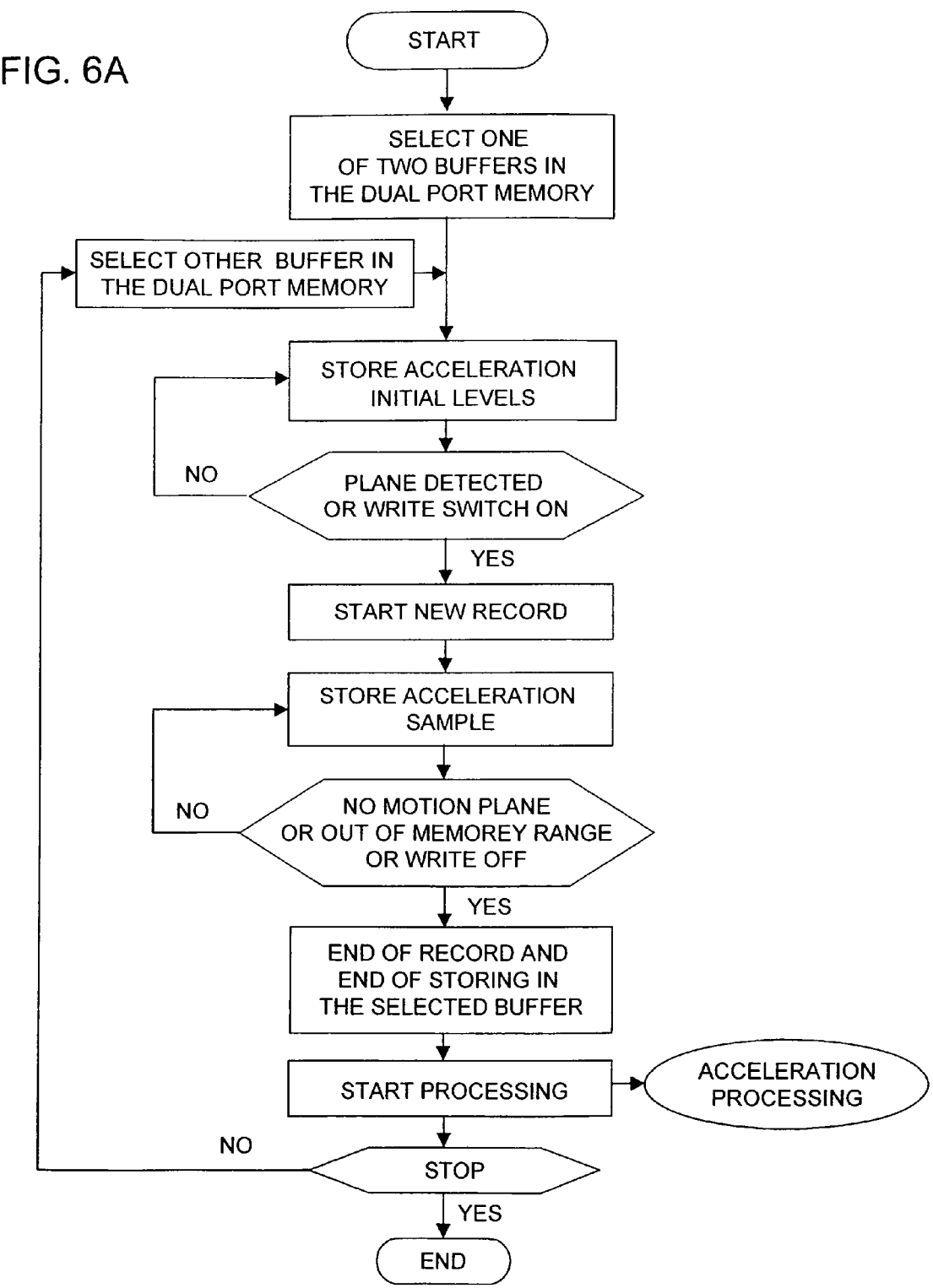
Figure 6B:
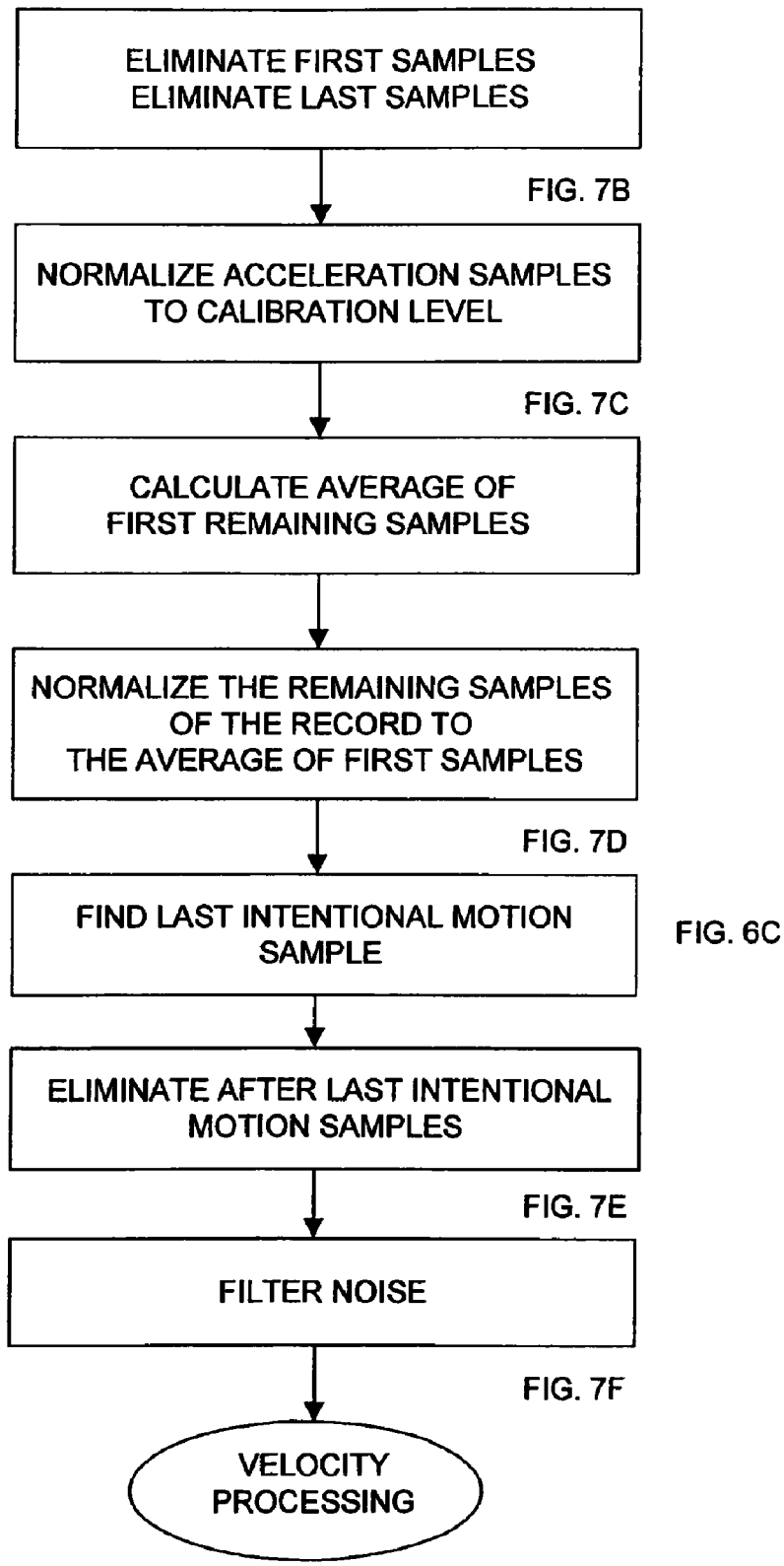
Figure 6C:
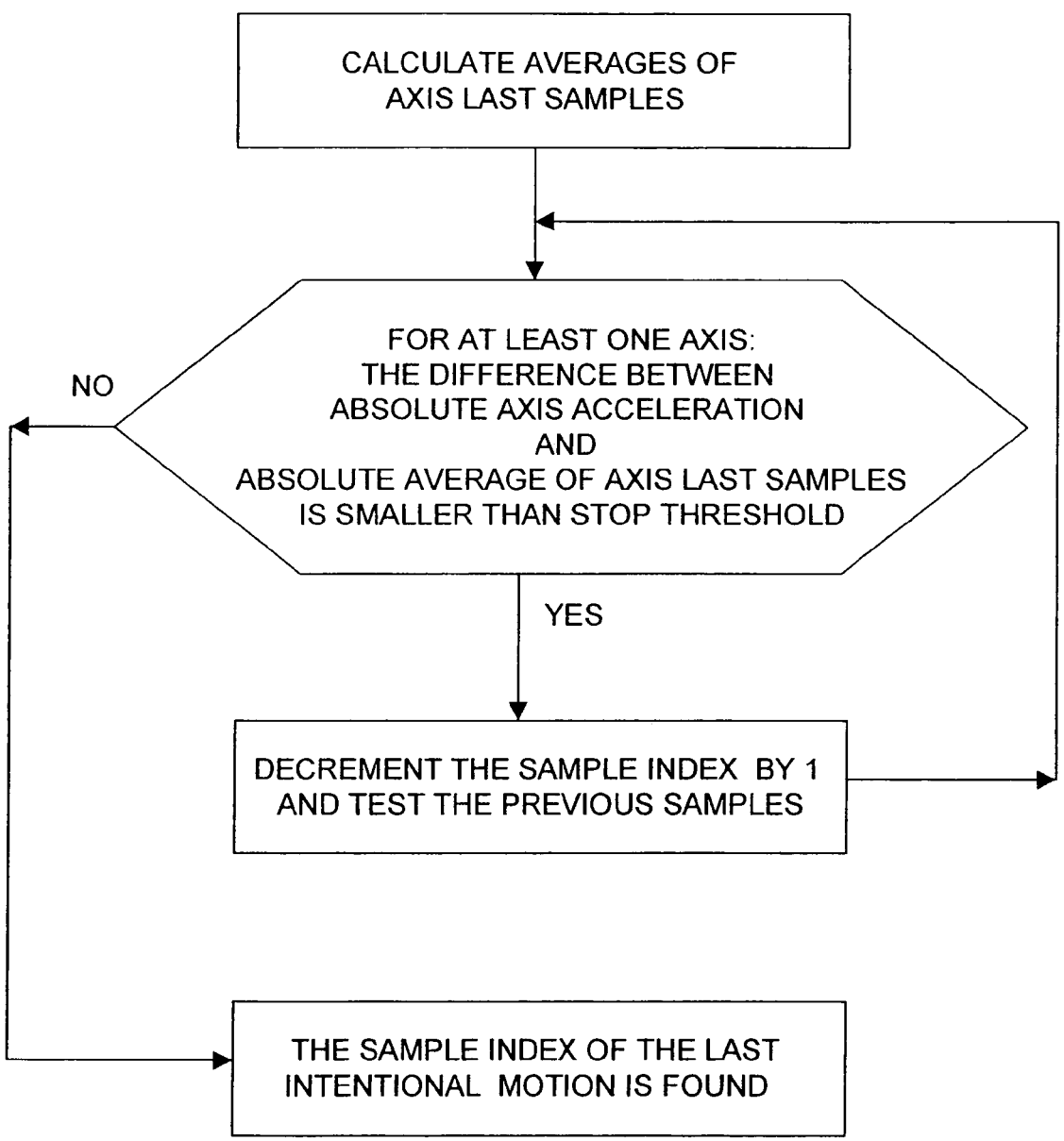
Figure 6D:
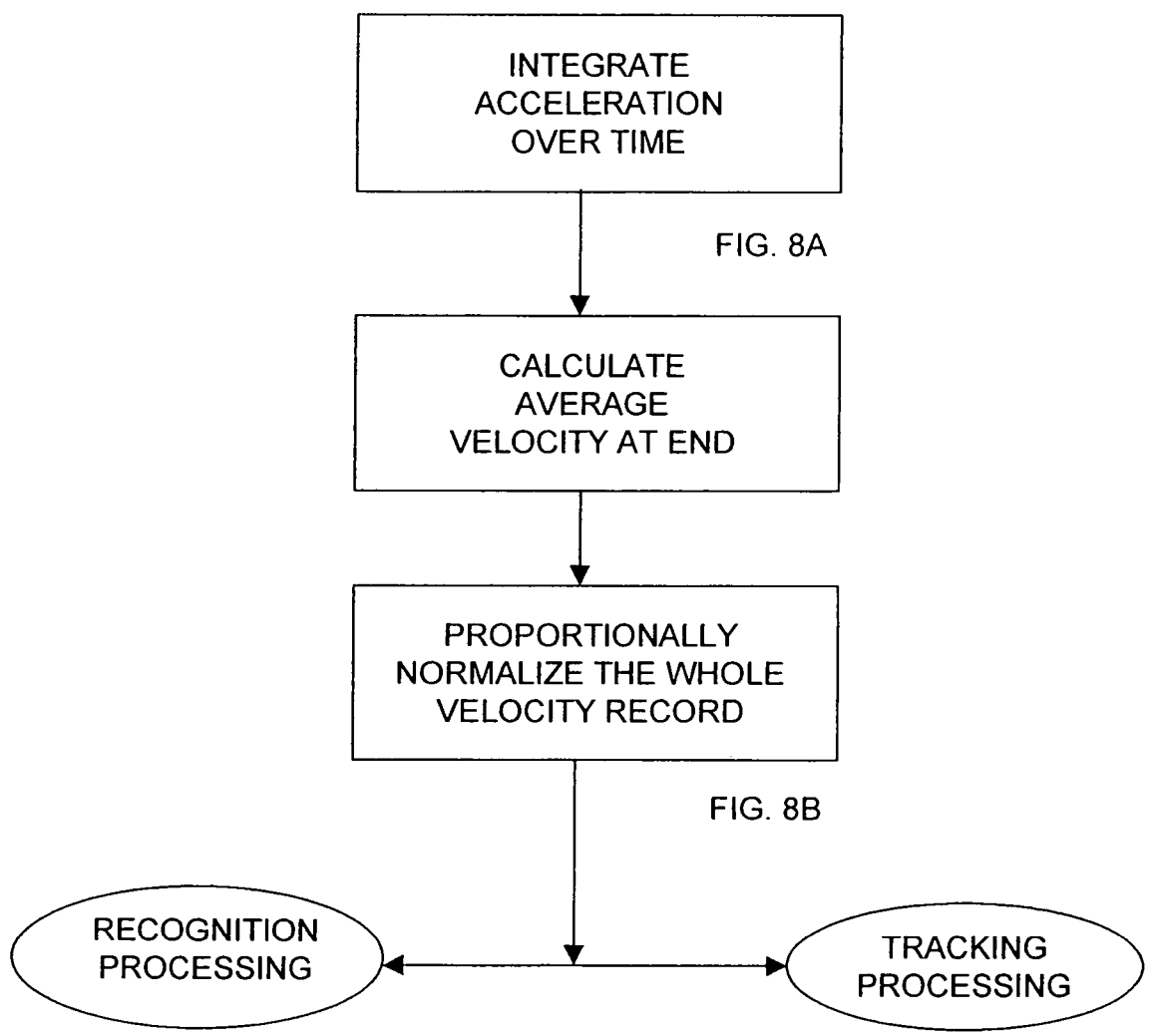
Figure 6E:
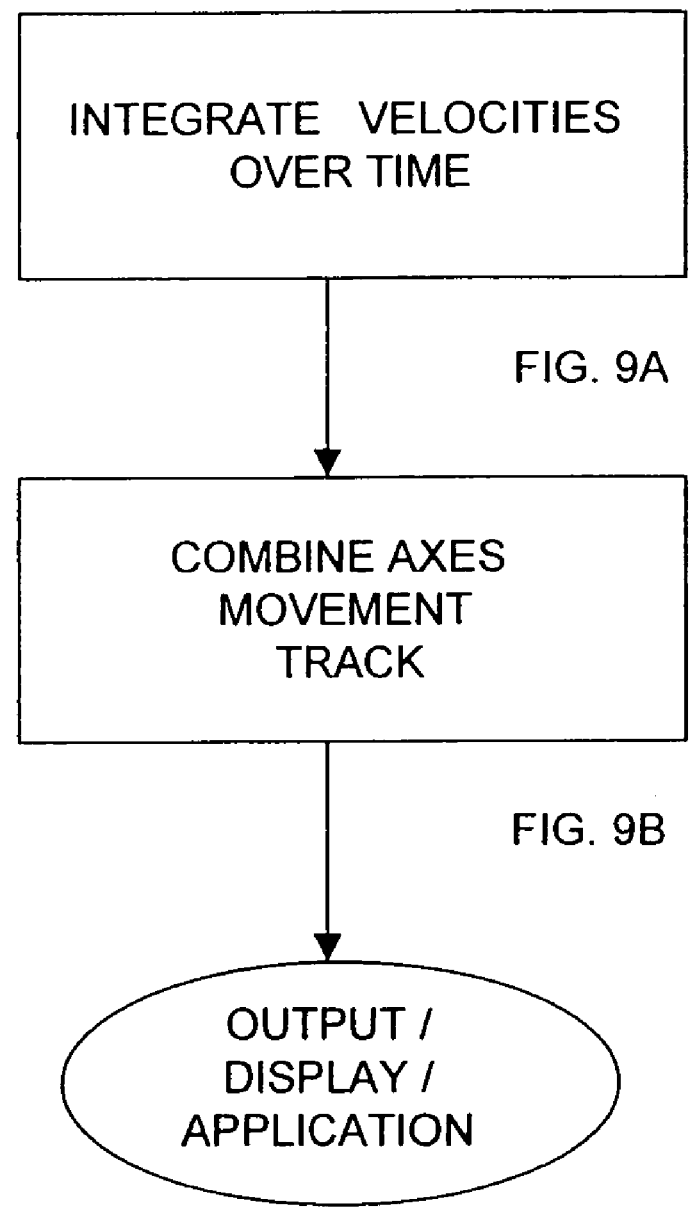

The operation of the apparatus of FIG. 5 is now be described in greater detail with reference to FIGS. 6A, 6B, 6C, 6D, 6E, 6F, 6G, 6H &, 6I, which are flow charts, illustrating some of the functionality of FIG. 5 and to FIGS. 7A, 7B, 7C, 7D, 7E & 7F, which are acceleration diagrams which are useful in the understanding of the functionality shown in FIGS. 6B & 6C, FIGS. 8A & 8B, which are each a velocity diagram which is useful in the understanding of the functionality shown in FIG. 6D, FIGS. 9A & 9B, which are each a diagram which is useful in the understanding of the functionality shown in FIG. 6E and FIGS. 10A, 10B, 10C, 10D, 10E, 10F, 10G, 10H & 10I are diagram which is useful in the understanding of the functionality shown in FIG. 6E.

Reference is made in the course of the description which follows also to FIGS. 11A, 11B, 11C, 11D, 11E, 11F, 11G, 11H, 11I, 11J & 11K, which are diagrams which are useful in the understanding of the functionality shown in FIGS. 6F, 6G, 6H & 6I and to FIGS. 12A, 12B, 12C & 12D are diagrams which are useful in the understanding of the functionality shown in FIGS. 6F, 6G, 6H & 6I.

Turning initially to FIG. 6A, which relates to the operation of data acquisition circuitry 506, dual port motion memory 522 and controller 530, it is seen that initially one of the two buffers in dual port motion memory 522 is selected by controller 530. Initial levels of the outputs of acceleration sensors 500, 502 and 504 are stored in the selected active buffer.

A determination is then made by controller 530 of whether a motion plane in three-dimensional space is detected or whether a write indication is otherwise provided. This detection may be made in one of typically three ways. By operation of contact sensor 534, by analysis of the outputs of acceleration sensors 500, 502 and 504 and by operation of the write/on/off switch 532. Upon detection of a motion plane, a new record is started and outputs of acceleration sensors 500, 502 and 504 are stored. Additional samples are stored until the outputs of the acceleration sensors 500, 502 and 504, or the contact sensor 534 indicate the absence of a motion plane, or a write signal is absent or until memory capacity is exceeded.

Upon termination of storing, the record is ended and processed, typically by acceleration processing circuitry 536. A typical record contains a large number of samples of the outputs of acceleration sensors 500, 502 and 504. Further records are processed in much the same manner, it being appreciated that by the use of two active buffers, the contents of one may be processed, while the other is being filled.

Figure 7A:
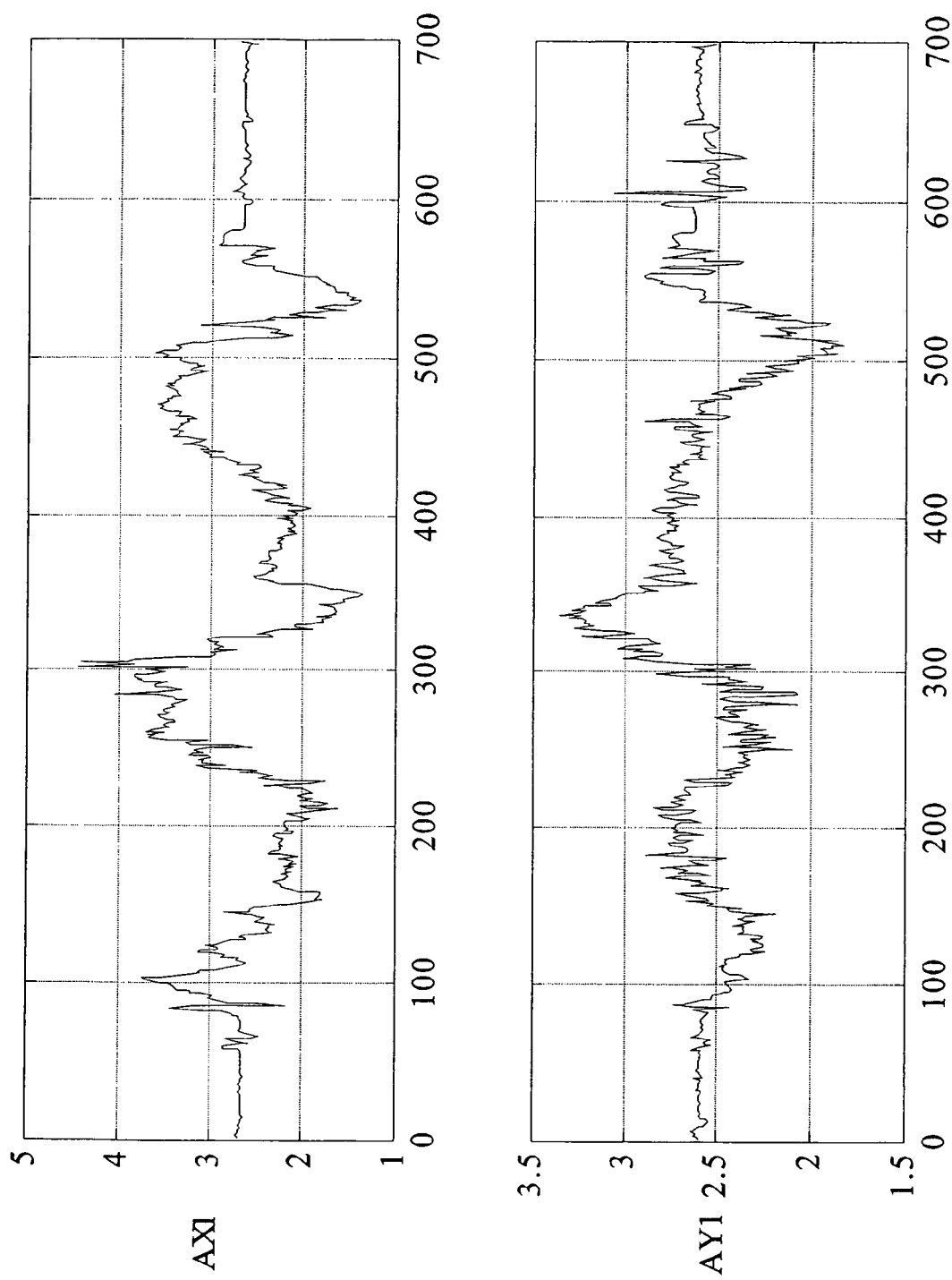
FIGS. 7A, 7B, 7C, 7D, 7E & 7F are acceleration diagrams which are useful in the understanding of the functionalities shown in FIGS. 6B & 6C.
Figure 7B:
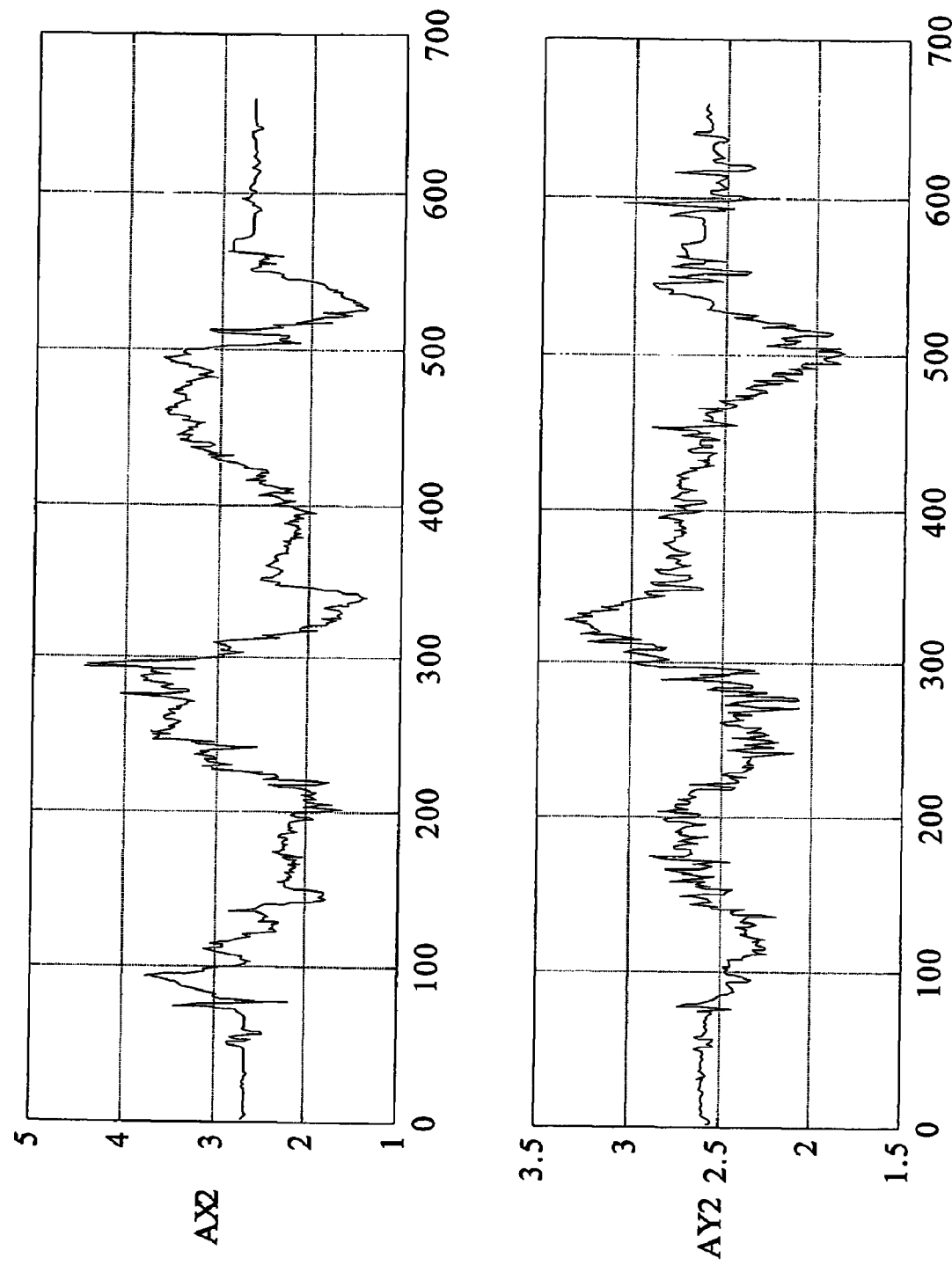
Figure 7C:
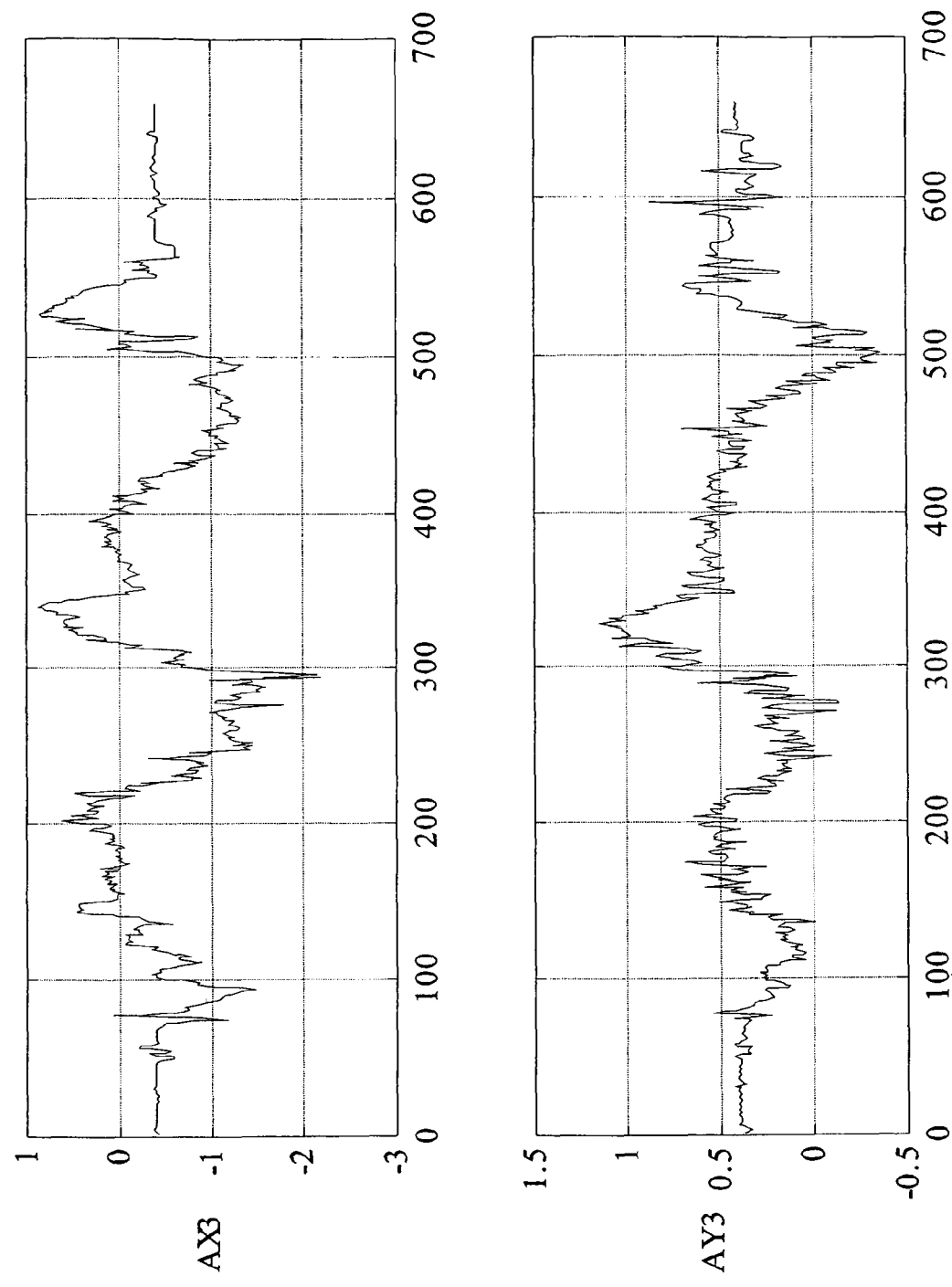

Referring now to FIG. 6B which relates to the operation of acceleration processing circuitry 536, it is seen that preferably, the first few and last few samples in each record are eliminated. This may be readily seen by viewing FIGS. 7A and 7B, which illustrate a record containing the outputs of the X and Y acceleration sensors 500 and 502 respectively, prior to and subsequent to elimination of the first few and last few samples therein. Following elimination of the first few and last few samples in the record, the remaining outputs of the acceleration sensors in the record are preferably normalized to a calibration level, as can be seen in FIG. 7C for the outputs of the X and Y acceleration sensors 500 and 502 respectively. Clearly, if three accelerometers are employed a Z acceleration sensor output is processed in a similar manner.

Figure 7D:
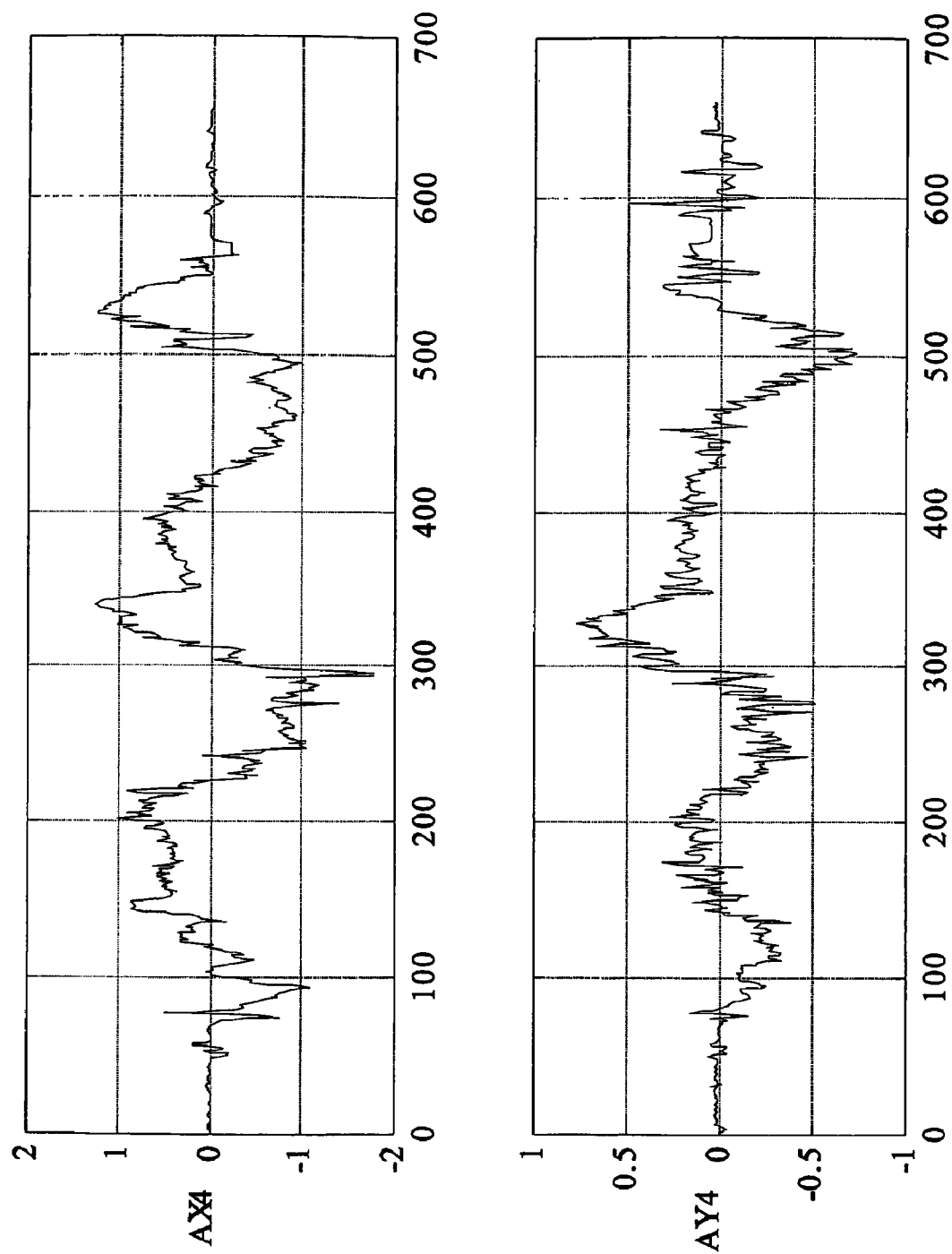
Figure 7E:
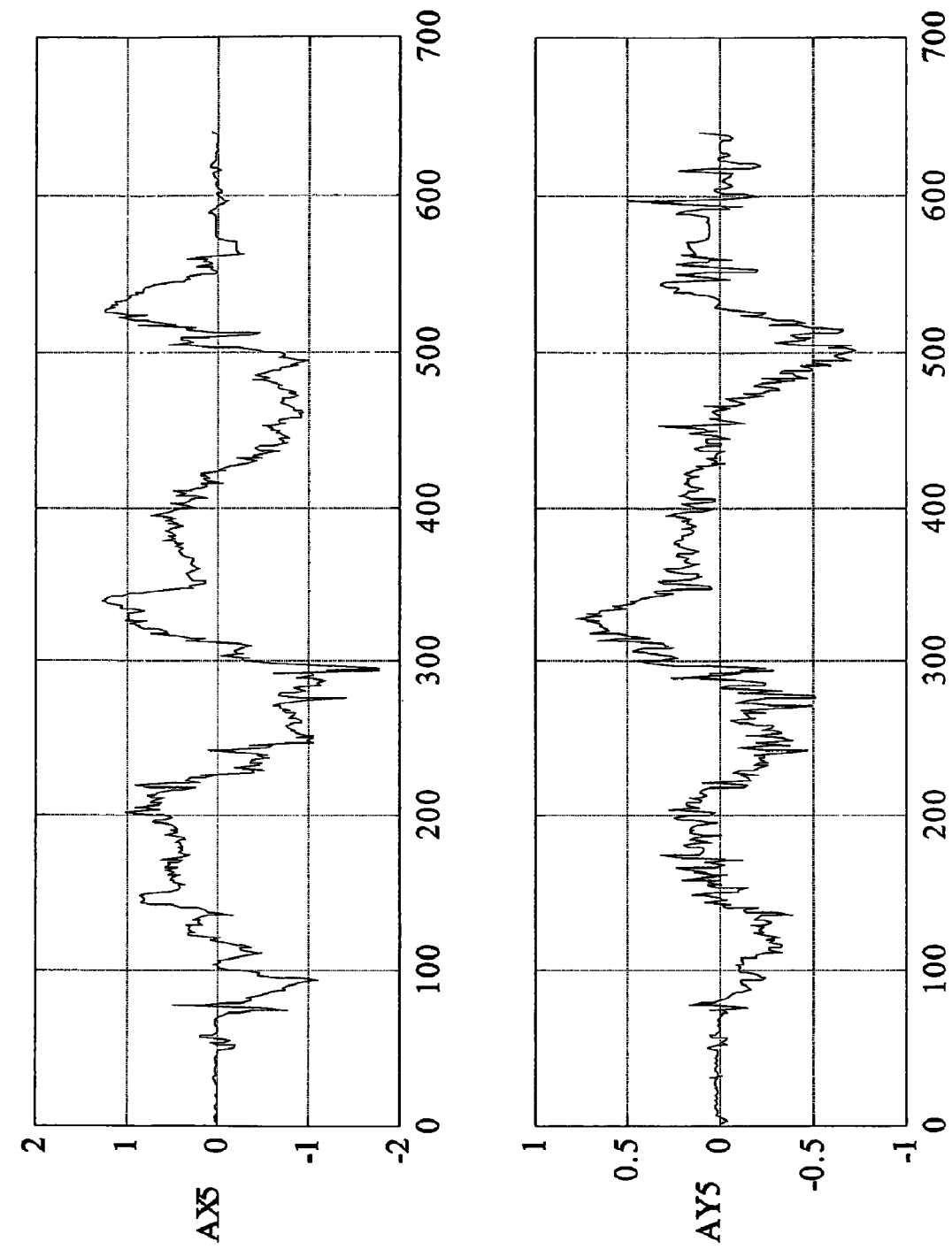

Following the normalization, an average of the first few remaining samples, typically about 10-30 samples, is taken. The remaining record is then normalized to a level of the average of the first few remaining samples. The result of this normalization for the outputs of the X and Y acceleration sensors 500 and 502 respectively is shown in FIG. 7D. The normalization of the acceleration record, according to the average of the first samples, as exemplified by the difference between the FIGS. 7C and 7D is a particular feature of the present invention.

Following this normalization according to the average of the first samples, the last intentional motion sample is detected, as is described hereinbelow with reference to FIG. 6C. The samples following the detected last intentional motion sample are eliminated, as illustrated for the outputs of the X and Y acceleration sensors 500 and 502 respectively in FIG. 7E. Noise is also filtered out, as illustrated for the outputs of the X and Y acceleration sensors 500 and 502 respectively in FIG. 7F and the resulting processed acceleration record is supplied for velocity processing by circuitry 538 (FIG. 5).

Reference is now made to FIG. 6C, which illustrates detection of the last intentional motion sample. A record of the output of at least one of the three acceleration sensors 500, 502 and 504, such as the record shown in FIG. 7D in respect of the output of the X acceleration sensor is examined to determine the average of the last few remaining samples.

Following determination of this average, the preceding samples is examined sequentially from the last few samples in a backwards in time direction until a variation from the average of at least a predetermined magnitude is encountered. The time location of this variation is determined to be the time location of the last intentional motion.

The foregoing process may be carried out in parallel for the outputs of all or some of the three acceleration sensors 500, 502 and 504. The existence of a variation from the average of at least a predetermined magnitude for even the output of just one of the acceleration sensors 500, 502 and 504 may be considered sufficient for finding the last intentional motion in the record for the outputs of all of the acceleration sensors 500, 502 and 504.

Figure 7F:
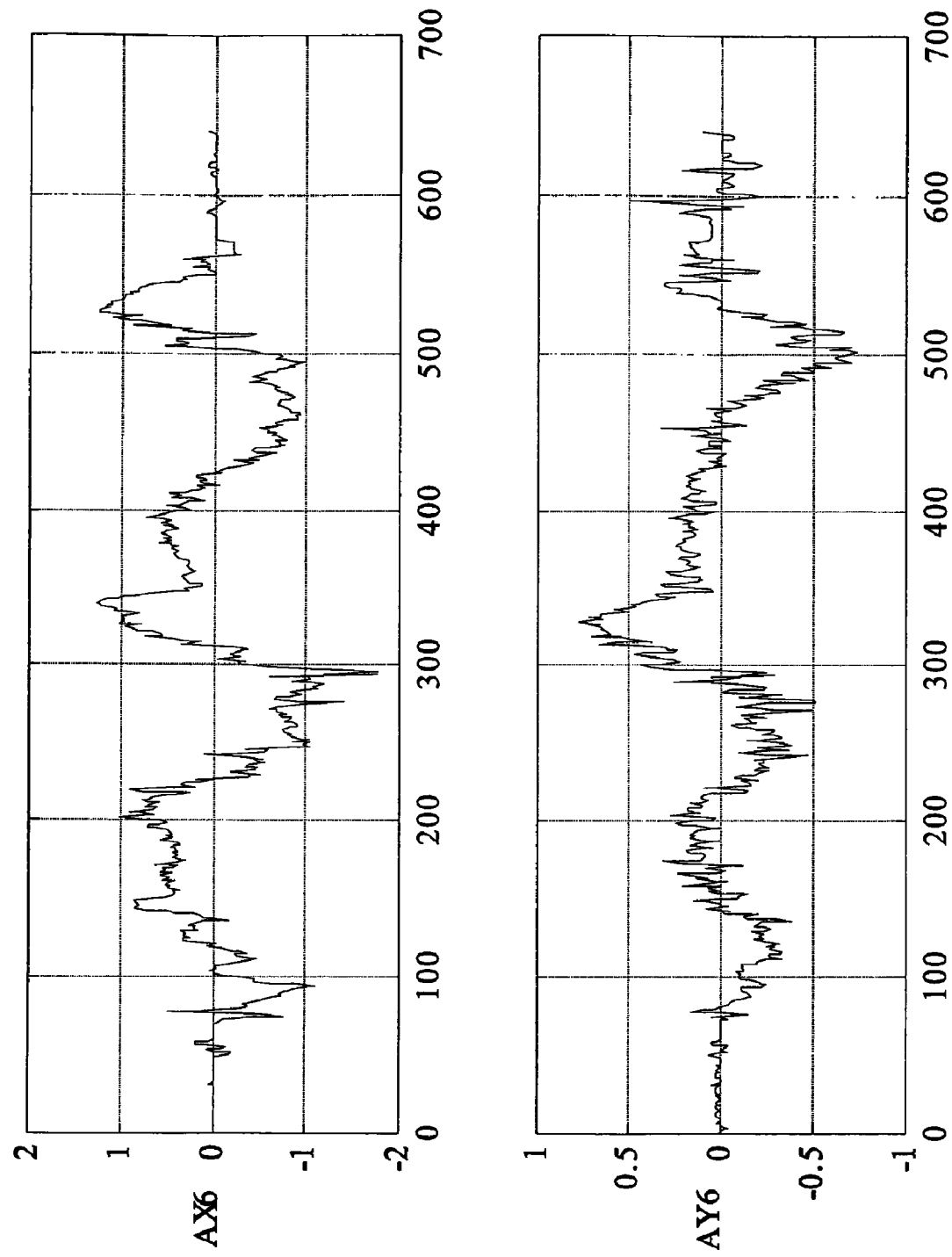

Reference is now made to FIG. 6D, which illustrates velocity processing in circuitry 538 in accordance with a preferred embodiment of the invention. The output of the acceleration processing circuitry 536, illustrated for example in FIG. 7F, is integrated over time to produce a velocity record. The velocity record corresponding to the acceleration input of FIG. 7F, appears in FIG. 8A.

The average velocity at the end of the velocity record, corresponding to the last few remaining acceleration samples, typically about 5-10 samples, is calculated.

Figure 8A:
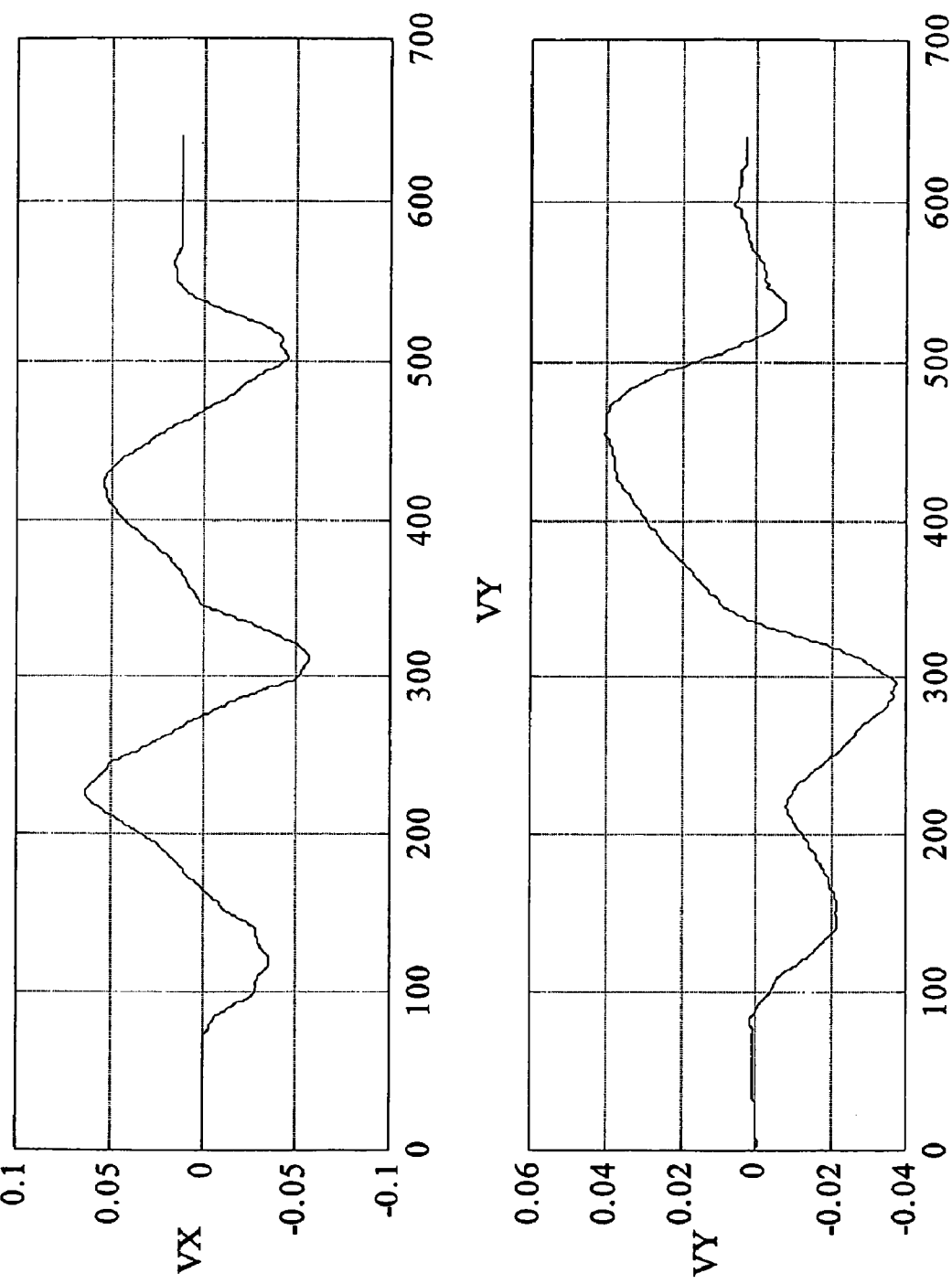
FIGS. 8A & 8B are each a velocity diagram which is useful in the understanding of the functionality shown in FIG. 6D.
Figure 8B:
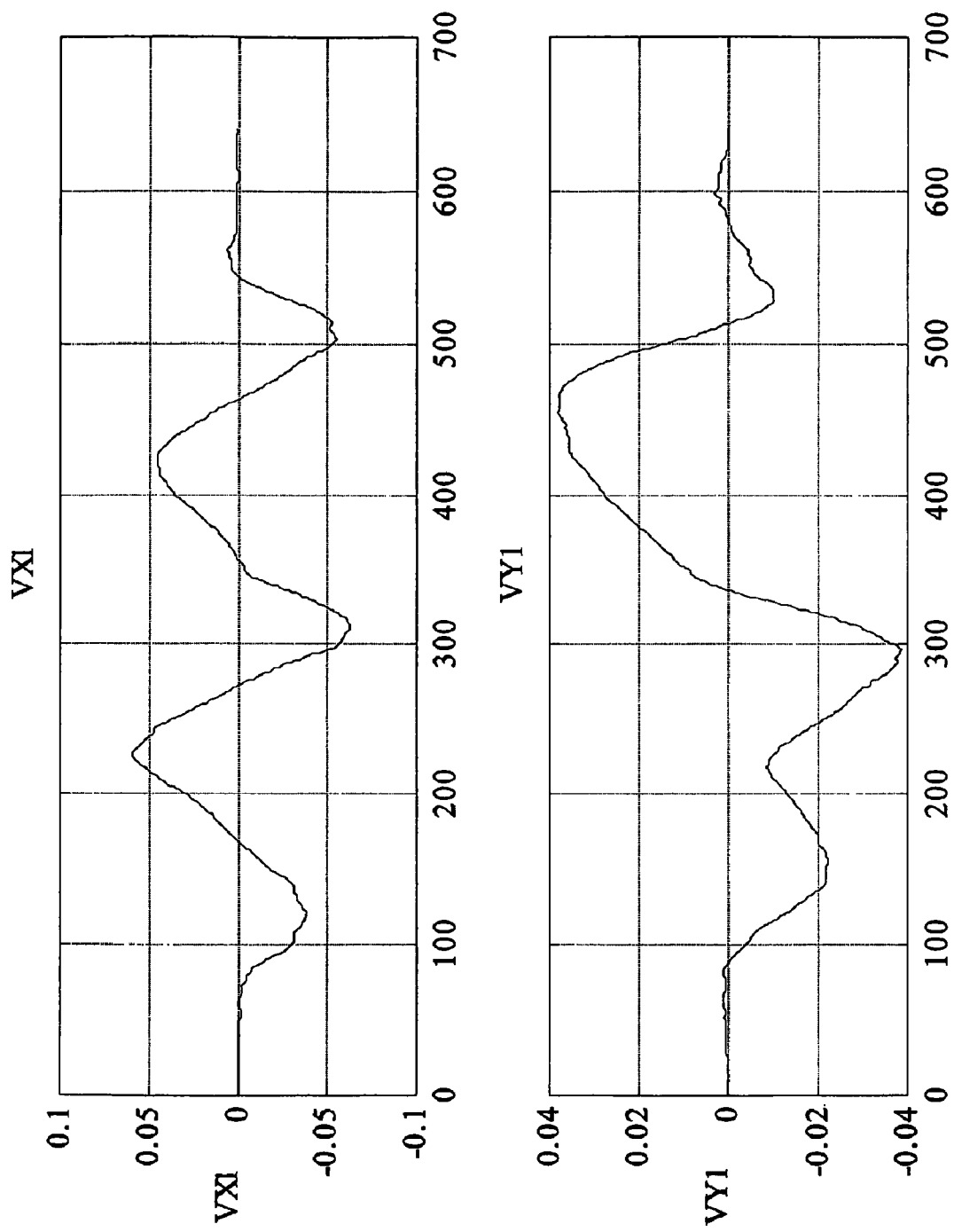
Figure 9A:
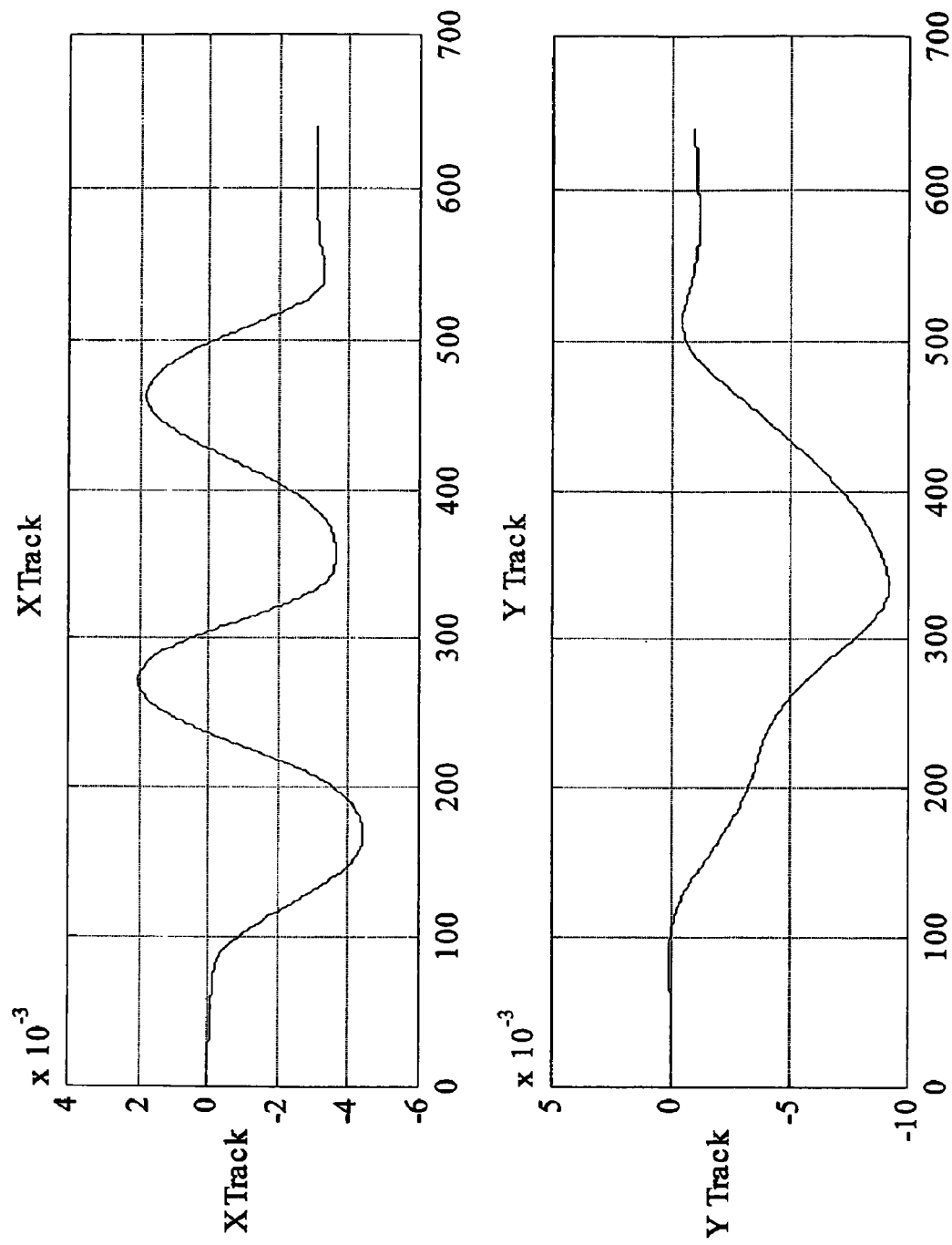
FIGS. 9A & 9B are each a diagram which is useful in the understanding of the functionality shown in FIG. 6E.
Figure 9B:
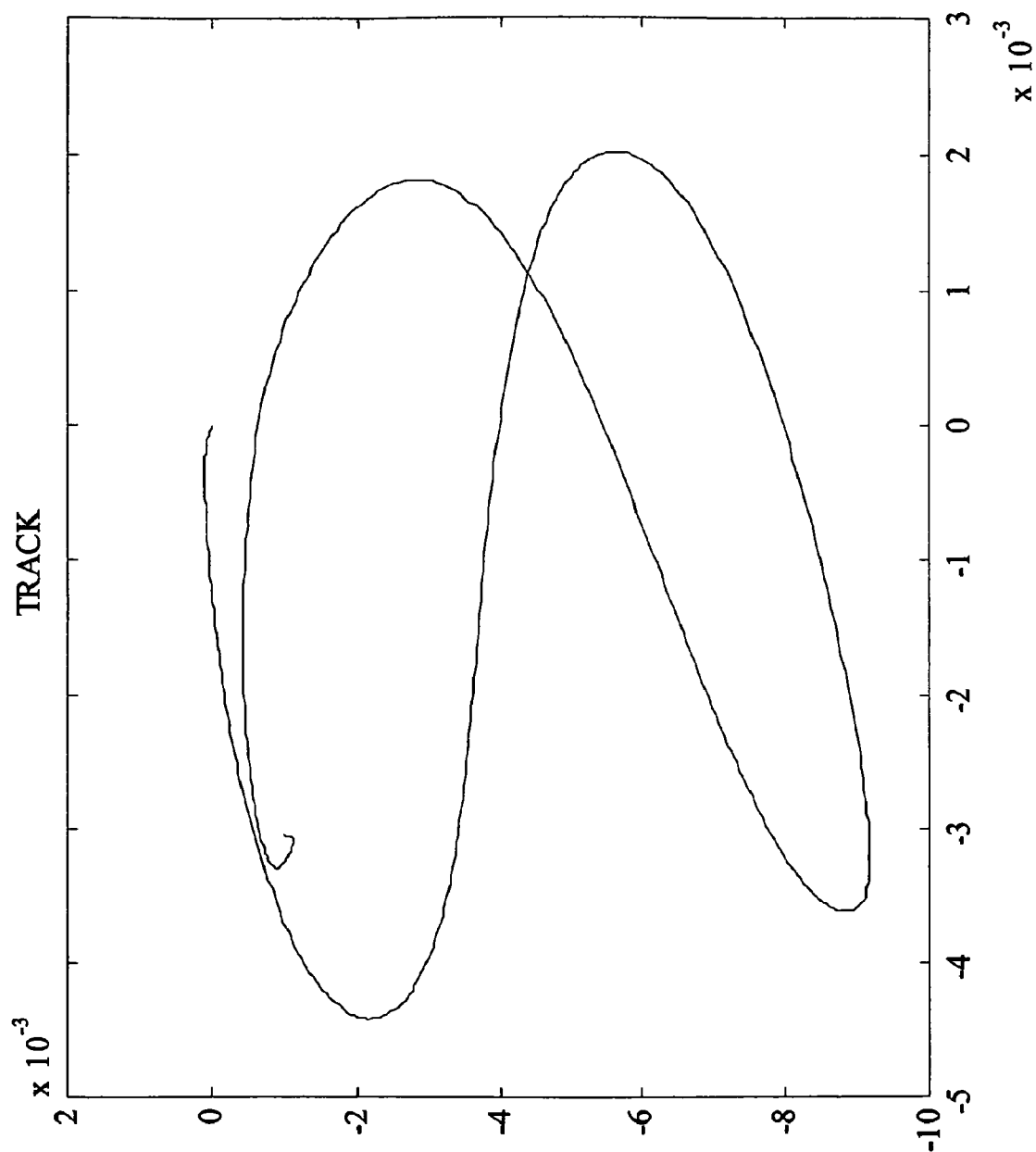

The velocity of the entire velocity record, e.g. of all values represented in FIG. 8A is now proportionally normalized between the beginning and end of the record, where the proportion of normalization applied at each sample within a velocity record is relative to the distance of that sample from the beginning and end of the record. FIG. 8B illustrates the proportionally normalized values VX1 and VY1 of FIG. 8A, for the X and Y components respectively. A suitable formula for obtaining the values VX1 and VY1 of FIG. 8B from the values VX and VY, respectively, of FIG. 8A is:

$$VX1(n)=VX(n)-n/N\times(X \text{ component of average velocity at } N)$$

$$VY1(n)=VY(n)-n/N\times(Y \text{ component of average velocity at } N),$$

where n is the index of samples within the record, n=1, . . . N.

The X and Y components of the average velocity at N (as computed in the second step of the method of FIG. 6D) are the average X and Y velocity values, respectively, where the averages are each taken over the last few (typically 5-10) velocity values in the velocity record of FIG. 8A, corresponding to the last few acceleration samples. In case of three dimensional motion a similar formula is applied also for the Z component of the velocity. The proportional normalization of the velocity record, as exemplified by the difference between FIGS. 8A and 8B is a particular feature of the present invention.

It is also a particular feature of a preferred embodiment of the present invention that, for a long track or complex track, the identification of minimum motion points along the track may be performed similarly to the process described hereinabove with reference to FIG. 6C and proportional normalization of the velocity, typically between each two adjacent such minimum motion points.

In the proportional normalization described above, the extent of normalization applied to an individual sample depends only on the position of the sample relative to the beginning and end of the record or record portion over which the normalization process is being effected. However, it is appreciated that, alternatively, more sophisticated weighting of the normalization process may be effected, taking into account factors other than the position of the sample, such as but not limited to the relative estimated motion levels at different minimum motion points. It should be noted that for multi dimensional motion the proportional normalization may apply to all or just some of the velocity components. For a case, which uses more than one velocity component it is allowed to use different minimum motion points and different proportional normalization formulas for each axis of motion.

The proportionally normalized velocity record corresponding to the velocity record of FIG. 8A appears in FIG. 8B and may be supplied for recognition processing at recognition circuitry 542 and/or for tracking processing at tracking circuitry 540.

Reference is now made to FIG. 6E, which illustrates tracking processing according to a preferred embodiment of the present invention, as preferably carried out by tracking circuitry 540. The output of the velocity processing circuitry 538 (FIG. 5), as exemplified by the normalized velocity record of FIG. 8B is integrated over time. The result of this integration is seen in FIG. 9A, which corresponds to the normalized velocity record of FIG. 8B.

Following this integration, which provides a displacement indication, the displacement indications corresponding to the outputs of all of the acceleration sensors, preferably all of the sensors 500, 502 and 504 are combined to provide a multi-dimensional indication of a displacement sequence. An example of this multi-dimensional indication for the X and Y acceleration sensor outputs appears in FIG. 9B.

Reference is now made to FIG. 6F, which illustrates a preferred embodiment of the velocity compression which is the first part of the recognition processing according to a preferred embodiment of the present invention, as preferably carried out on velocity information by recognition circuitry 542. The output of velocity processing circuitry 538, exemplified in FIG. 8B, is preferably supplied for X' and Y' threshold calculations. The X' and Y' velocity components may be parallel to the X and Y components sensed by acceleration sensors 500 and 502 but need not necessary be so, particularly if the motion plane is not parallel to the X,Y plane of the acceleration sensors 500 and 502.

Figure 10A:
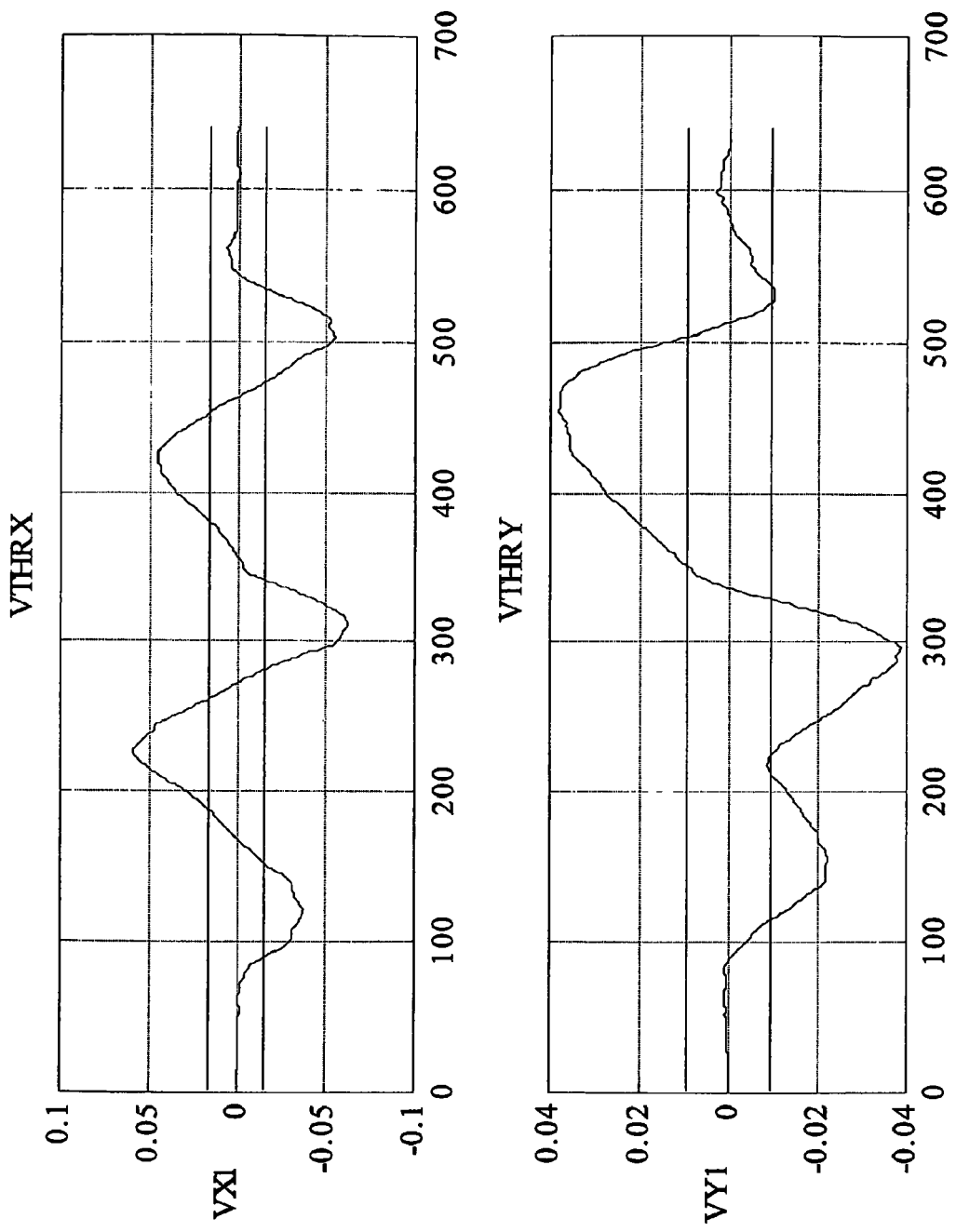
FIGS. 10A, 10B, 10C, 10D, 10E, 10F, 10G, 10H & 10I are diagrams which are useful in the understanding of the functionality shown in FIG. 6F.
Figure 10:
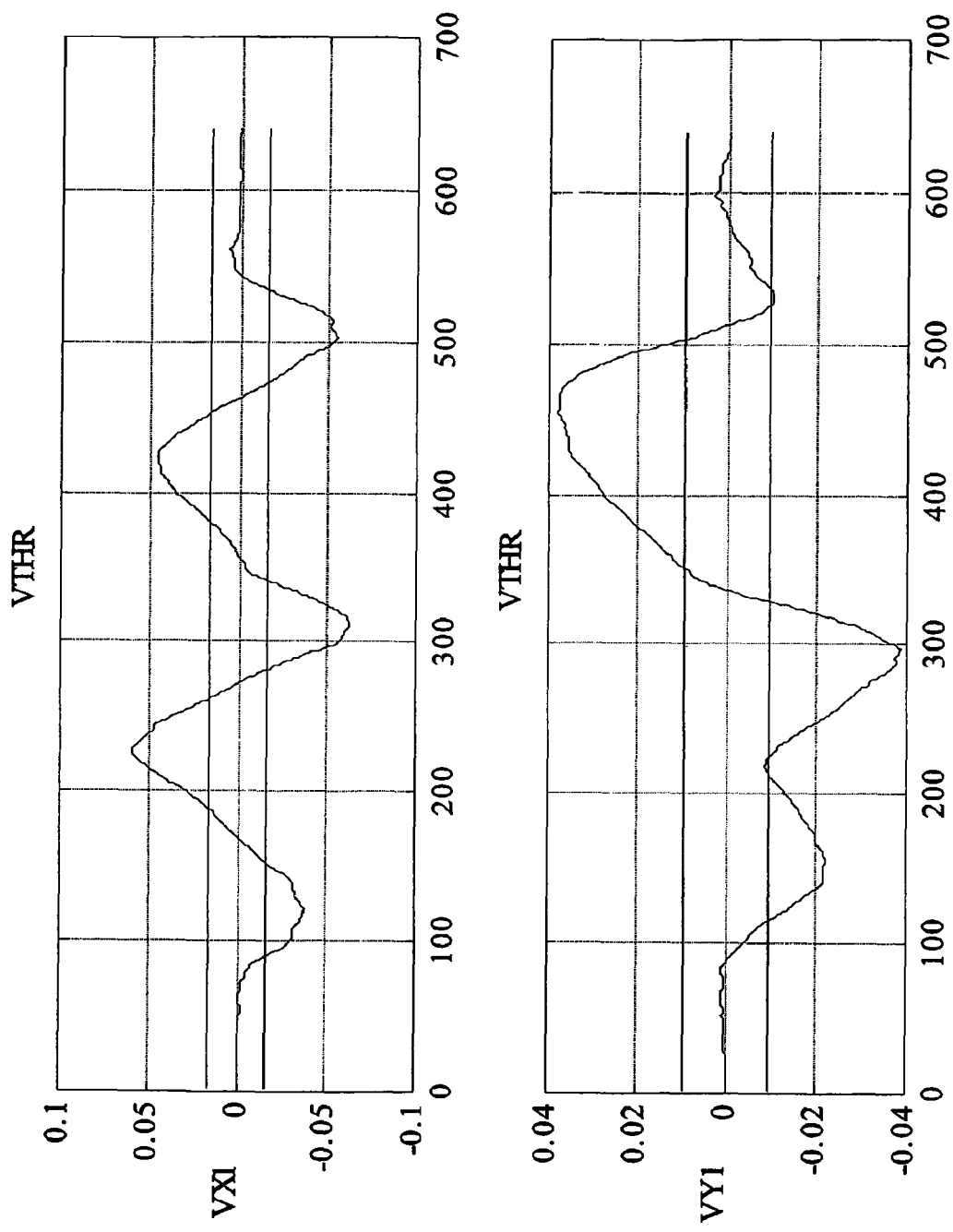
Figure 10:
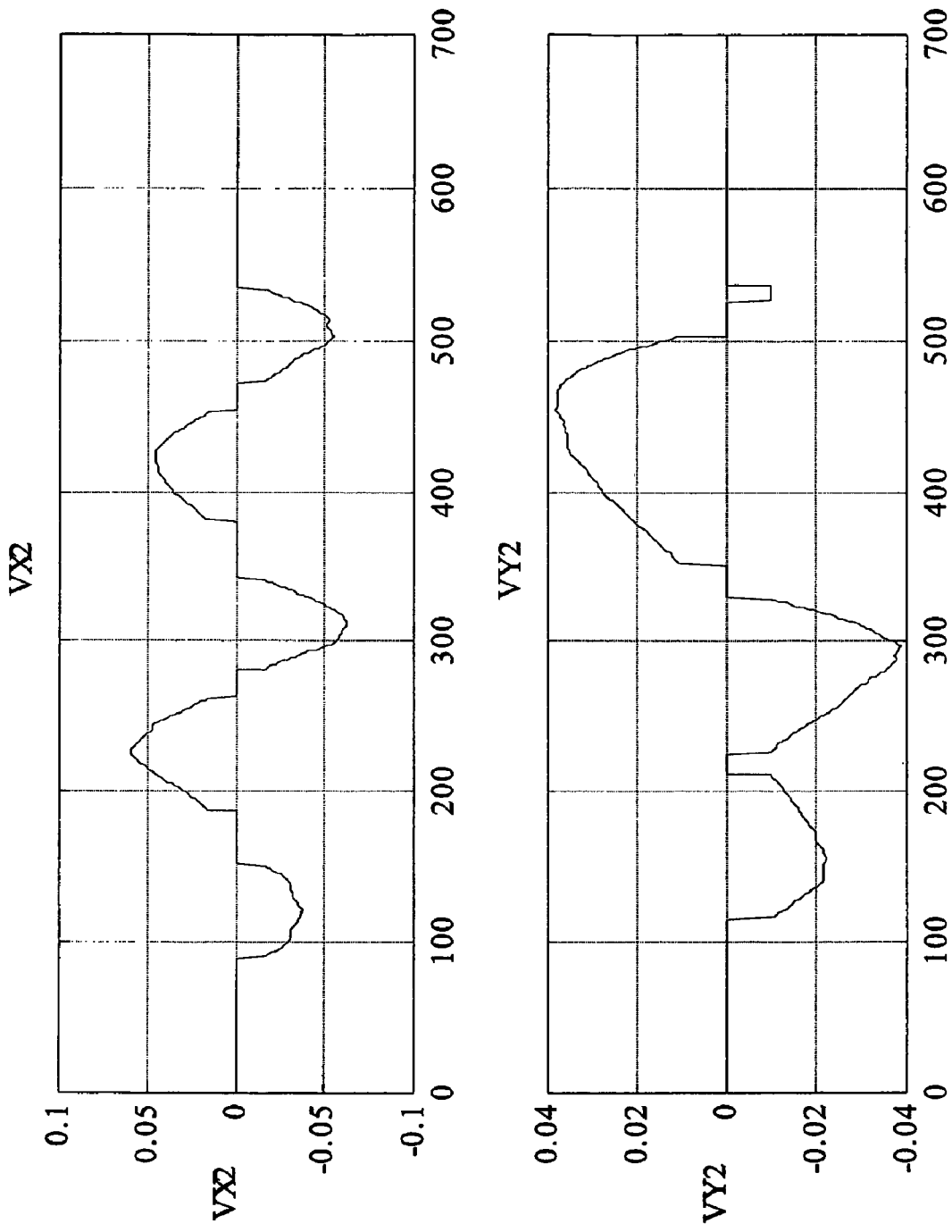

Typical X' and Y' velocity thresholds are illustrated in FIG. 10A. Calculation of the X' and Y' thresholds may be carried out in the following manner:

The maximum and minimum peak values of the X and Y components of velocity are noted.

For each of the X and Y components of velocity separately, a determination is made as to whether the absolute value of the maximum or the minimum peak value is greater.

For each of the X and Y components of velocity separately, a percentage of the peak value which is greater for that velocity component, typically 25% of the peak value, is typically selected as the absolute difference of the applicable thresholds from zero.

The absolute differences of the applicable thresholds for the X and Y components of velocity are preferably compared. If the absolute difference of the applicable threshold of one of the components exceeds that of the other of the components by a certain amount or multiple, typically a multiple of three, the absolute differences of both thresholds are both selected to be identical to the higher absolute difference. If, however, the absolute difference of the applicable threshold of one of the components does not exceed that of the other of the components by that certain amount or multiple, the absolute differences of both thresholds are not necessarily identical and remain as separately calculated for each component of the velocity.

Thus, it may be appreciated that in a case, such as that shown in FIG. 10A, wherein the absolute difference of the applicable threshold of the Y component does not exceed that of the X component by more than a multiple of three, the absolute differences of both thresholds are not identical and remain as separately calculated for each component of the velocity. Thus FIG. 10B, showing the result of calculation of the mutual threshold, is here identical to FIG. 10A.

At this stage, the respective thresholds are applied to the X and Y components preferably in the following manner: The absolute values of both the X and Y components of the velocity, which fall below their respective thresholds are made equal to zero. A result of this operation appears in FIG. 10C.

Figure 10D:
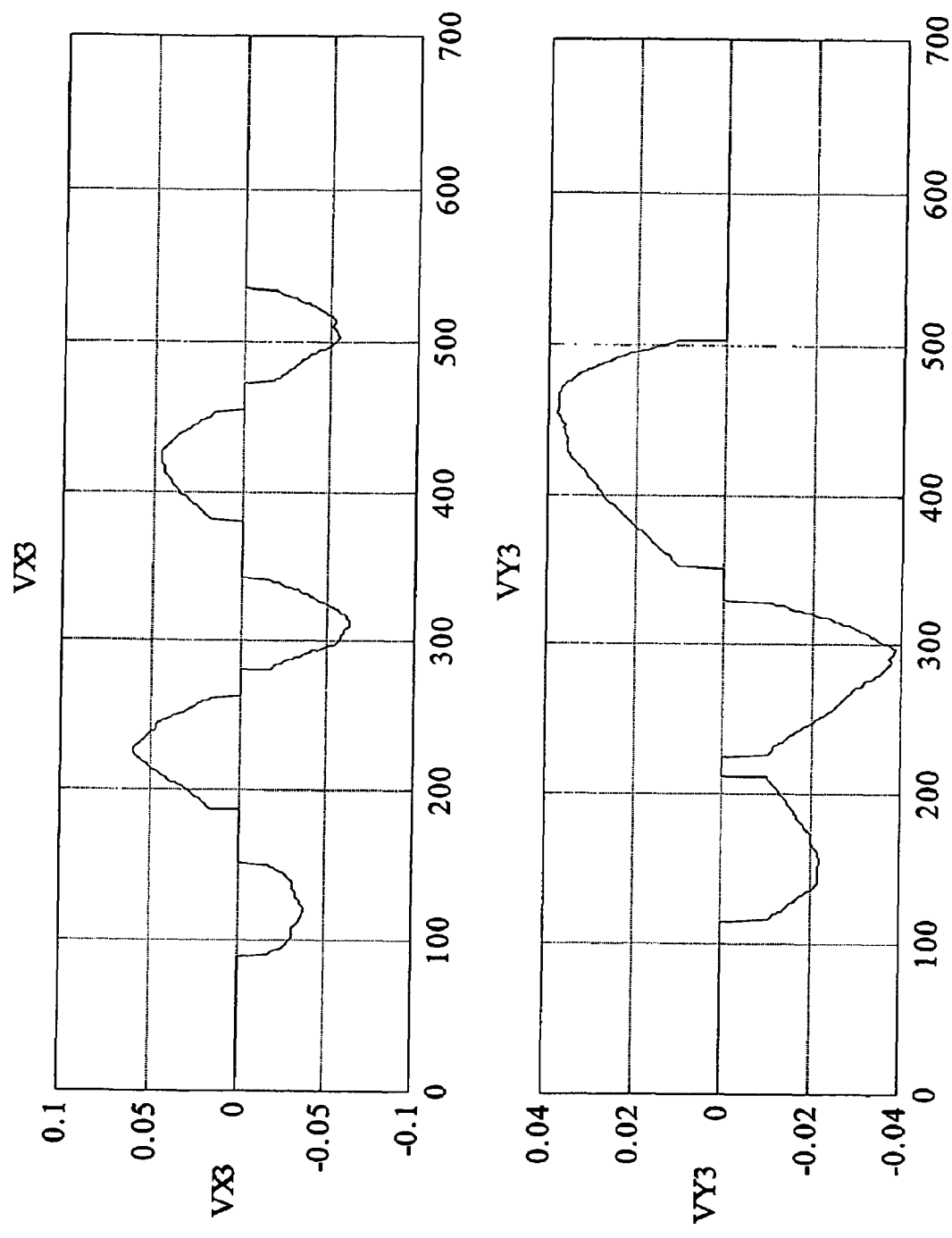
Figure 10:
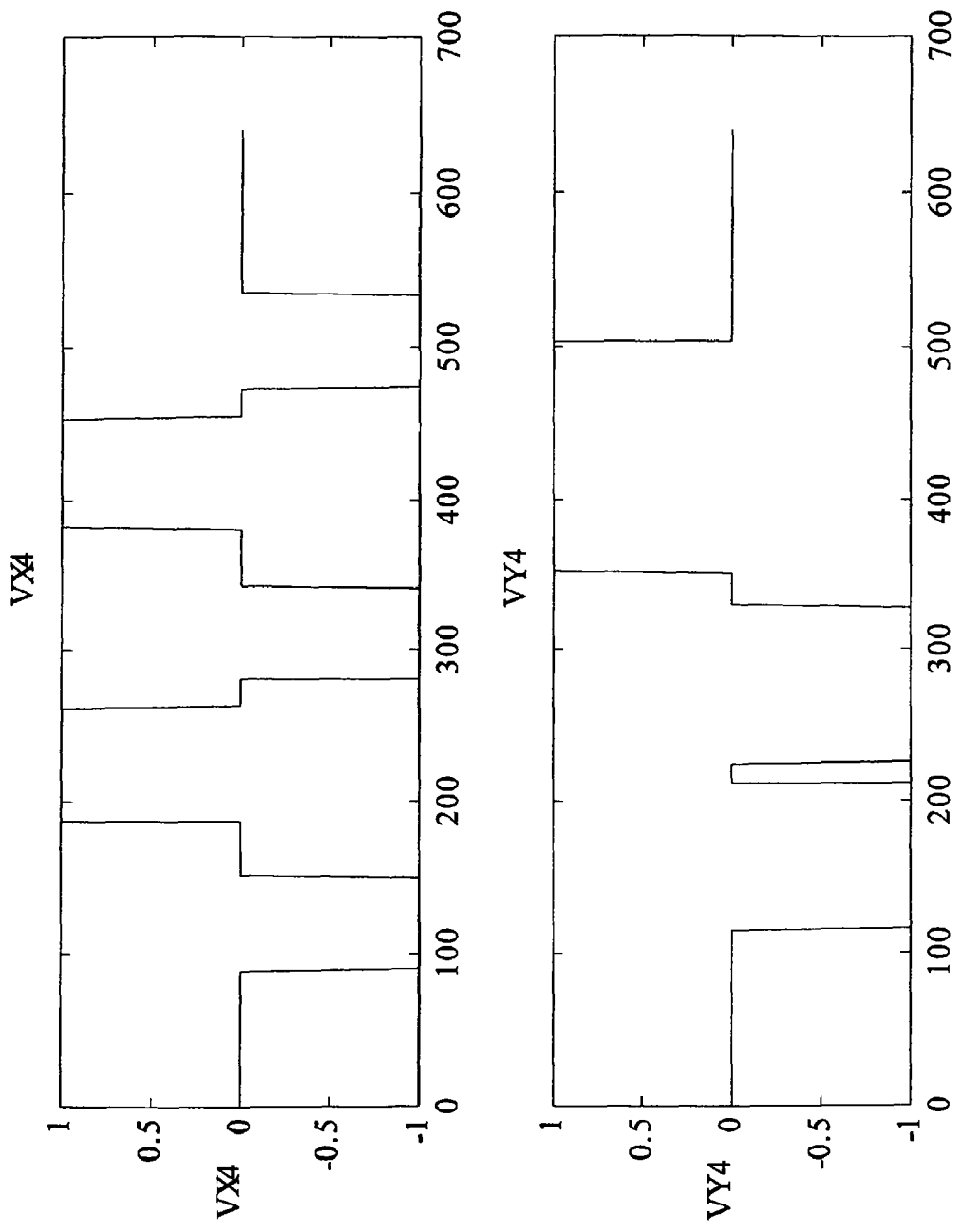

Thereafter, short duration segments of the thresholded velocity components are preferably filtered out. Typically segments having a duration of less than 60 milliseconds are filtered out. A result of this operation is illustrated in FIG. 10D.

Following the filtering, a digitization operation is performed on the filtered thresholded velocity components. In the illustrated embodiment, the digitization operation, preferably comprises binarization, wherein all positive direction segments are given the same positive value and all negative direction segments are given the same negative value. A result of this operation is shown in FIG. 10E. It is appreciated that other digitization schemes may be applied to the velocity and may serve for the implementation of the compression and recognition processes described hereinbelow with reference to FIGS. 6F, 6G, 6H and 6I.

Figure 10F:
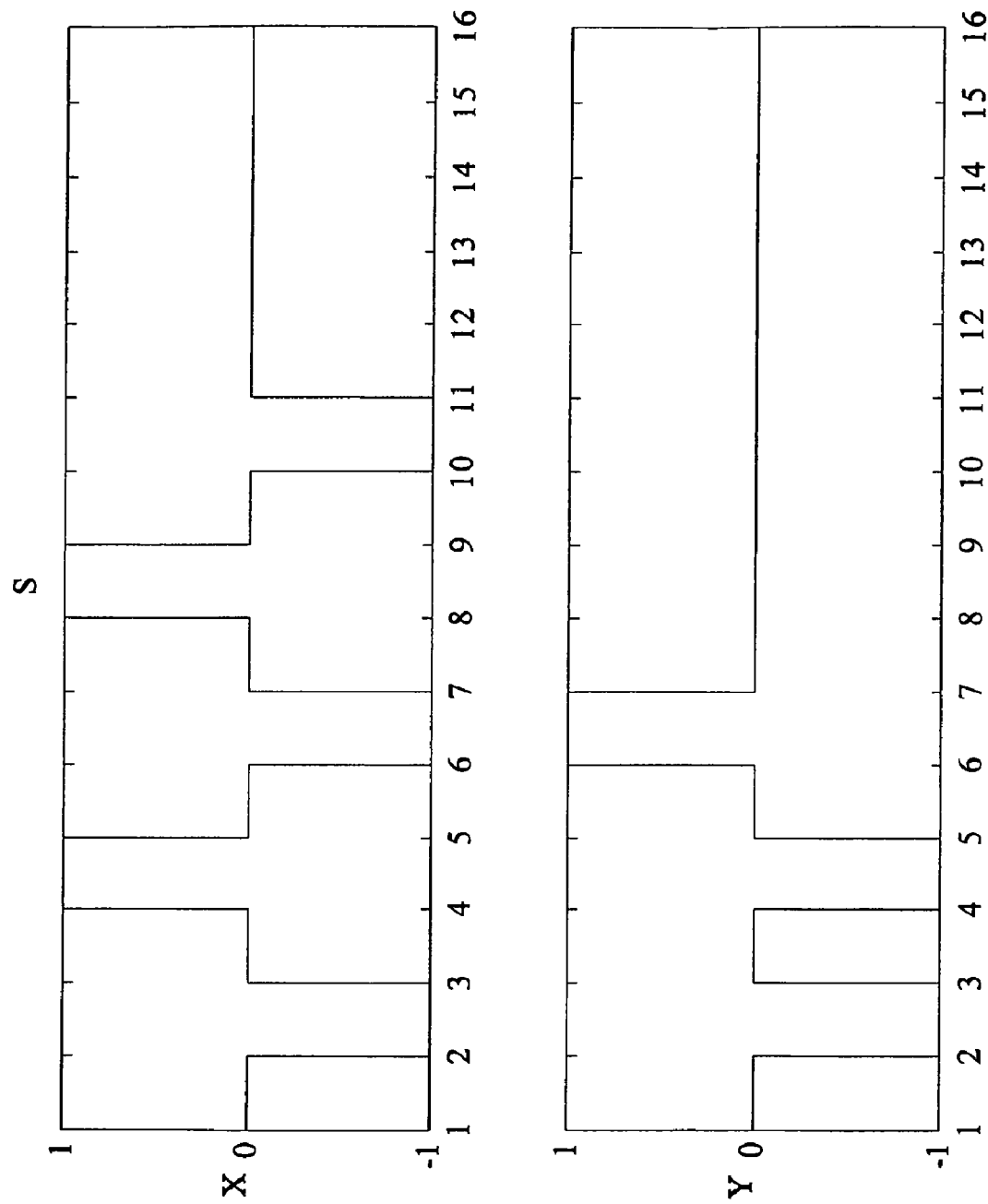

The digitized information for the X and Y velocity components is then preferably separately analyzed to detect value changes therein. Each such change is indicated together with its sign and the time duration between changes is ignored. A result of this compression operation is shown in FIG. 10F, where the abscissa indicates the number of changes, irrespective of their sign. A digital representation of the information contained in FIG. 10F appears in FIG. 11A.

Following detection and indication of value changes separately for the X and Y velocity components, merger operation of indications of value changes is preferably carried out. In the illustrated embodiment each uninterrupted sequence of pairs of oppositely signed value changes which begins with a value change of the same sign, i.e. pairs of value changes which lie in the realm between 0 and −1 in FIG. 10F, are identified by a single indication of a pair of value changes, as seen in FIG. 10G.

Figure 10G:
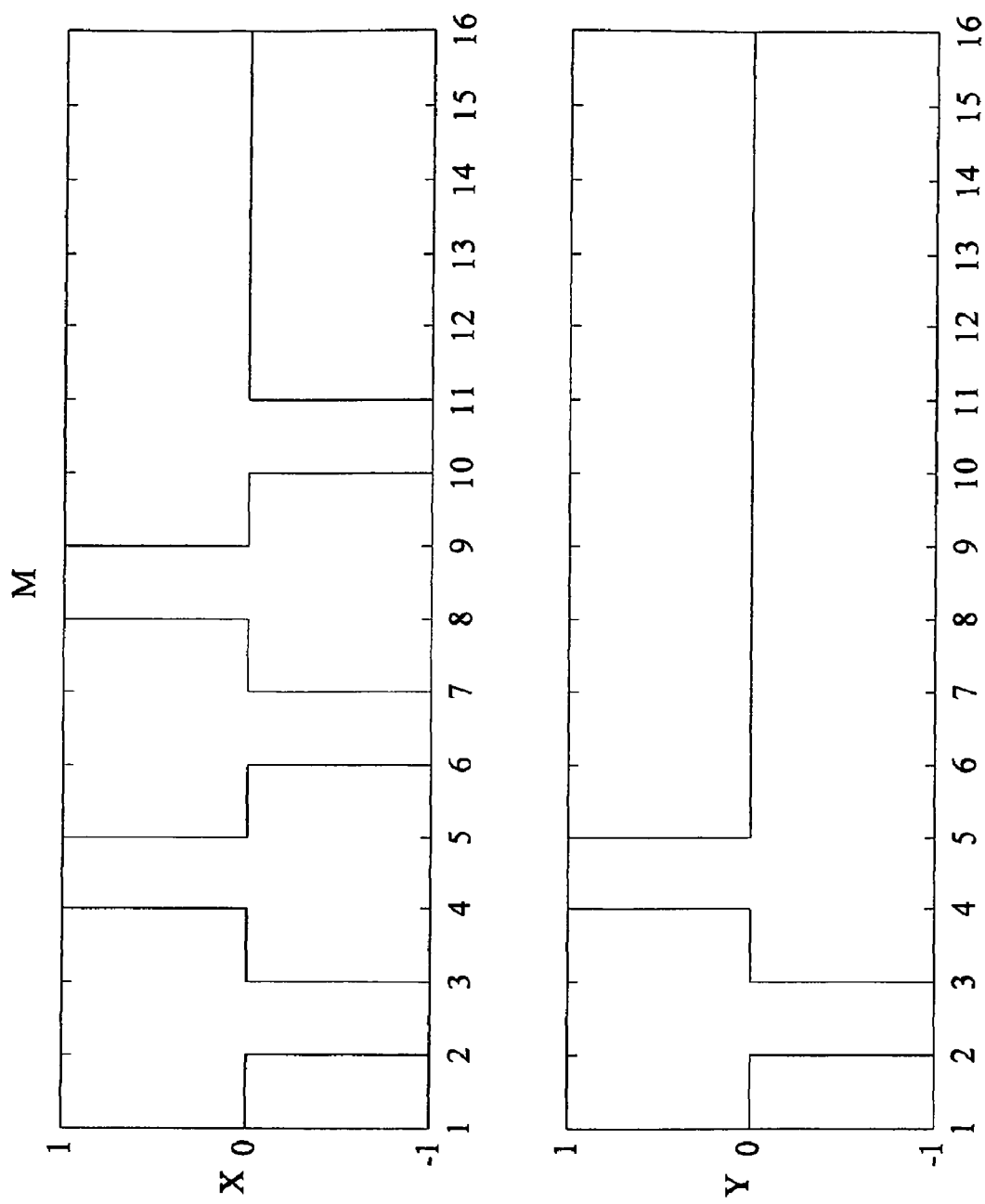
Figure 10:
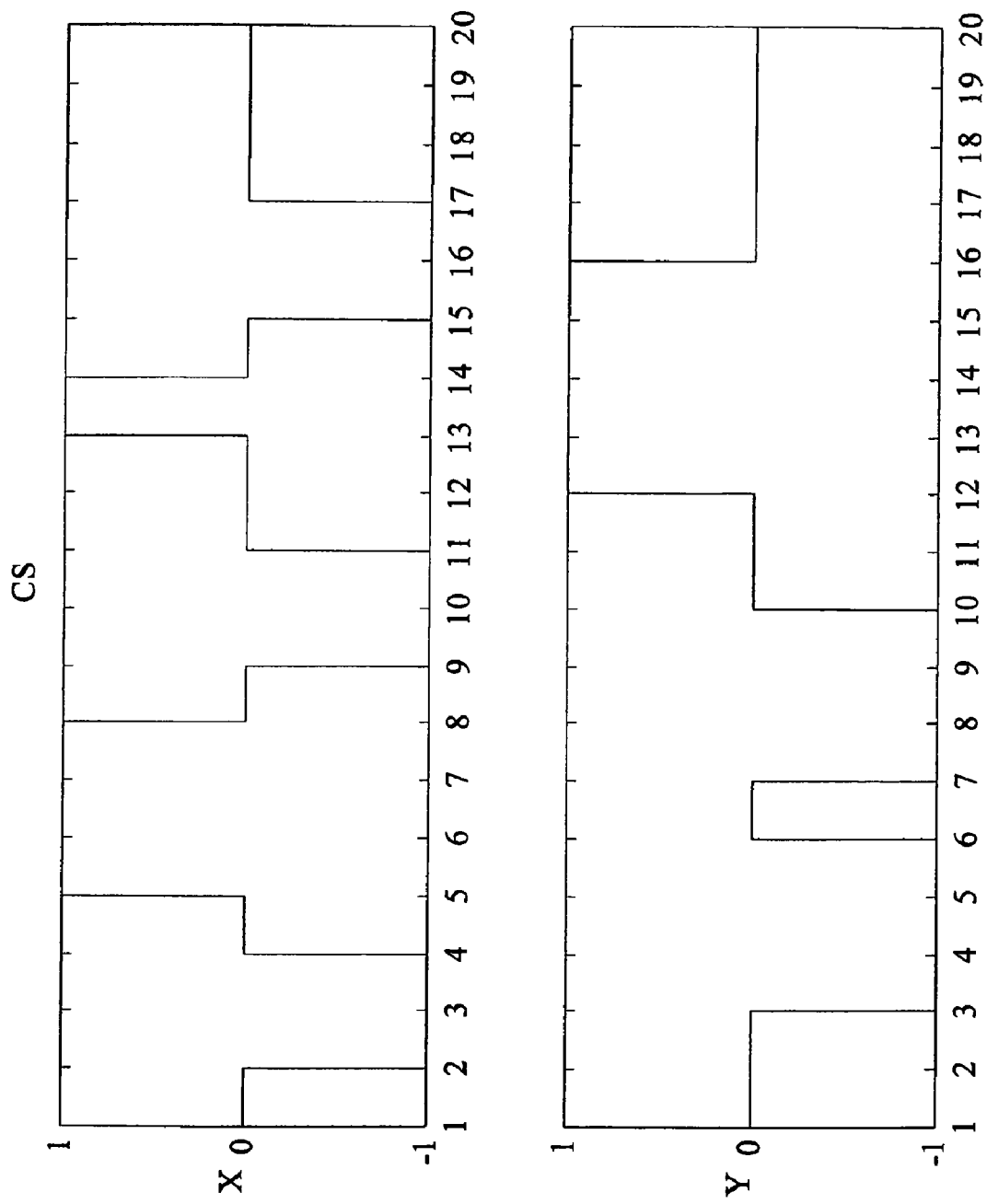
Figure 10:
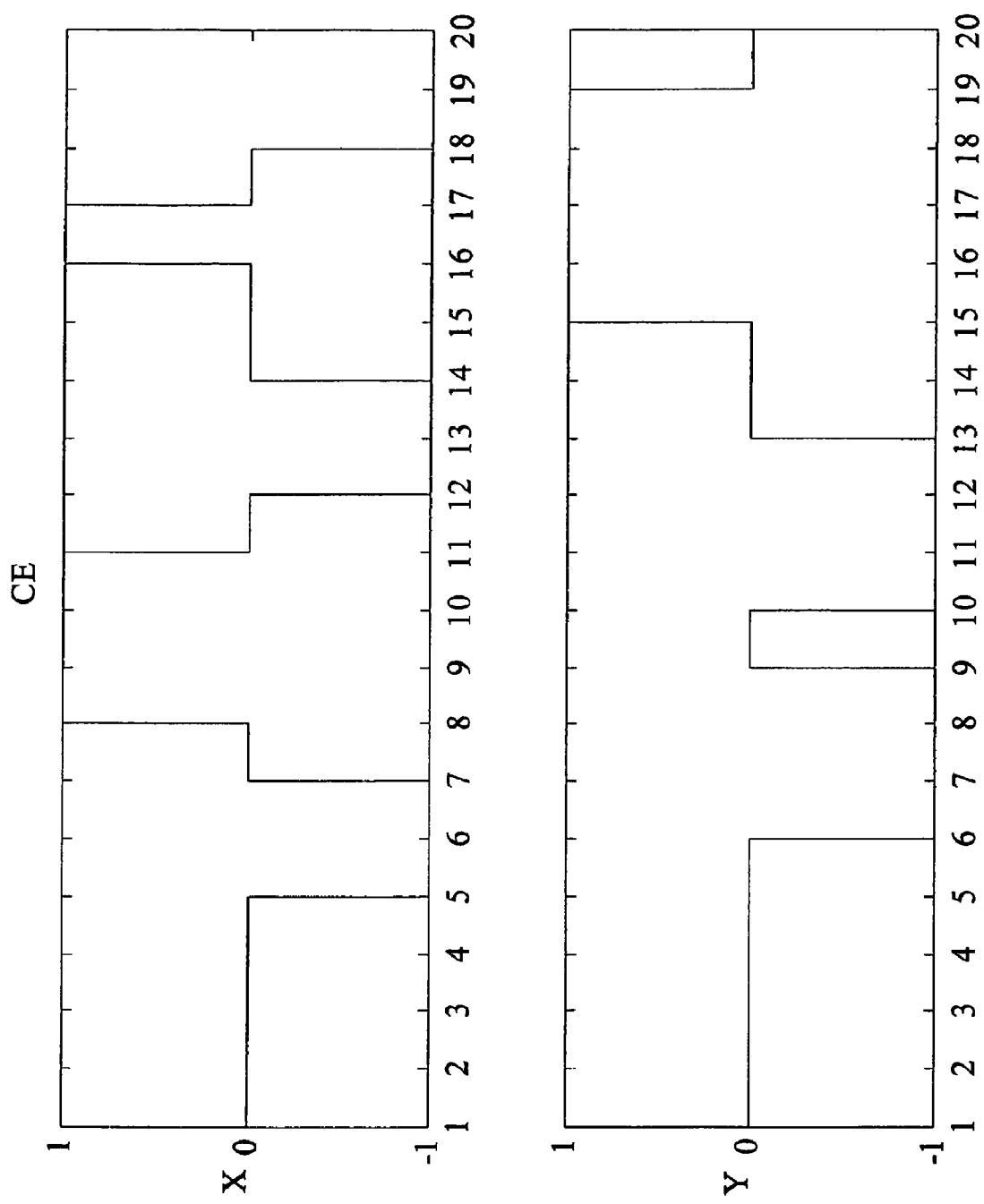

It is noted from a comparison of FIGS. 10F and 10G, that the indication of the value changes for the X component does not change from FIG. 10F to FIG. 10G. In the indication of the value changes for the Y component, however, there does appear in FIG. 10F, one uninterrupted sequence of pairs of oppositely signed value changes which begins with a value change of the same sign, and it is seen in FIG. 10G that this sequence is represented by a single indication of a pair of value changes. A digital representation of the information contained in FIG. 10G appears in FIG. 11B.

Following the merger of indications of value changes illustrated in FIG. 10G, the thus merged indications, represented digitally in FIG. 11B are preferably binary encoded, preferably employing the encoding matrix appearing in FIG. 11C. A matrix indicating the binary code corresponding to the X and Y components shown in FIG. 10G, appears in FIG. 11D.

The digitized information illustrated in FIG. 11A are also preferably binary encoded, preferably employing the encoding matrix appearing in FIG. 11C. A matrix indicating the binary code corresponding the X and Y components shown in FIG. 10F, appears in FIG. 11E.

The digitized information for the X and Y velocity components, typified by the diagrams in FIG. 10E, is also preferably analyzed to detect value changes therein in a slightly different manner. Each such change is indicated together with its sign and the time duration between changes is ignored. A result of this compression operation is shown in FIG. 10H, where the abscissa indicates the total number of changes both in the X and the Y velocity components, irrespective of their sign and irrespective of whether such changes took place in the X velocity component or in the Y velocity component. A digital representation of the information contained in FIG. 10H appears in FIG. 11F.

It is thus appreciated that comparing the diagrams of FIGS. 10F and 10H, it is seen that the difference is in the indexing along the abscissa. Whereas in FIG. 10F, the index count increases only with each value change in the X or Y velocity component to which each diagram relates, in FIG. 10H, in contrast, the index count increases with each value change in either the X or Y velocity component.

Figure 11J:
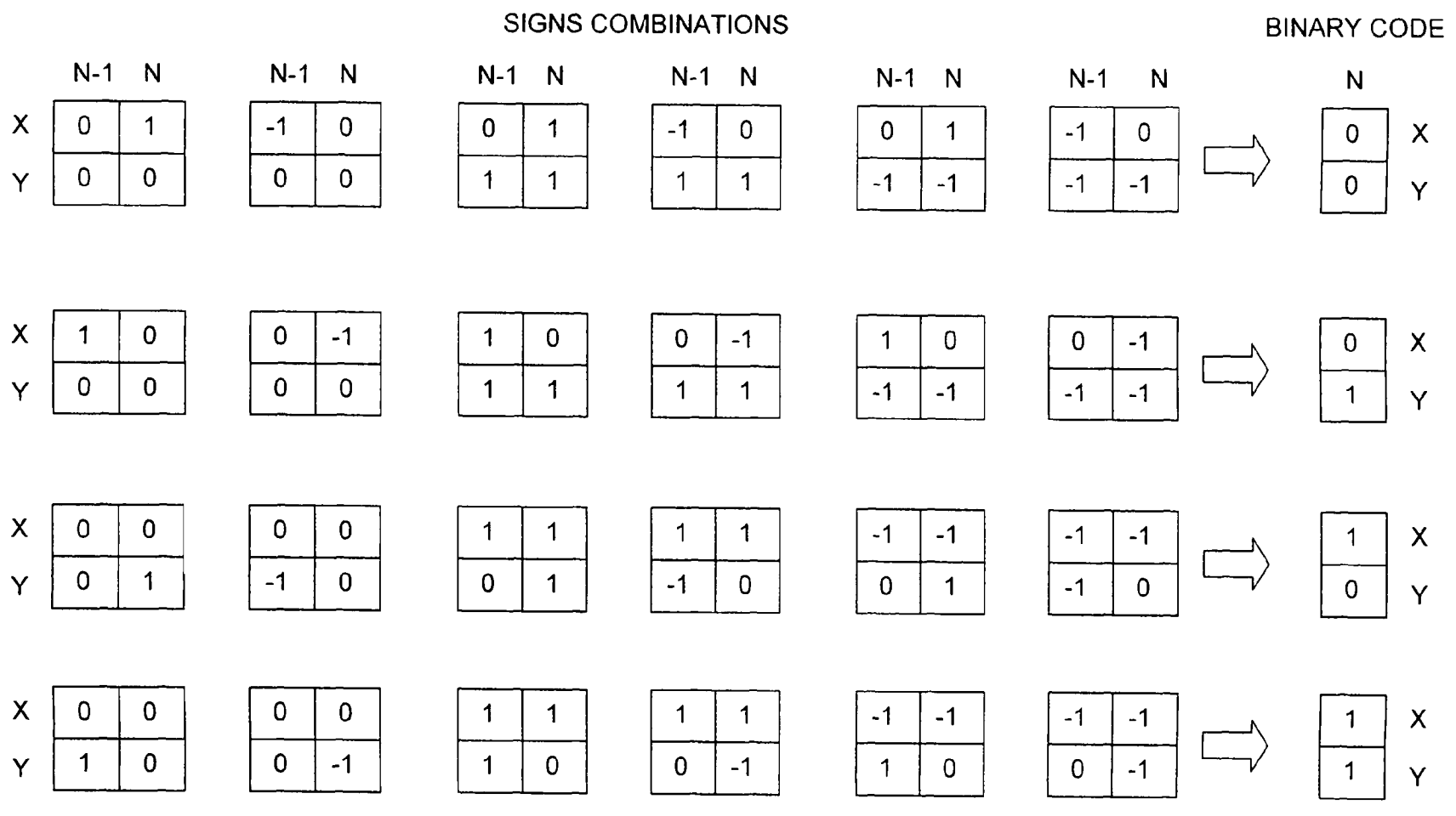

The information appearing in FIG. 11F is preferably binary encoded, in a partially overlapping manner, preferably employing the encoding matrix appearing in FIG. 11J. A matrix indicating the binary code corresponding to the X and Y components shown in FIG. 10H, appears in FIG. 11G.

The digitized information for the X and Y velocity components, typified by the diagrams in FIG. 10E, is also preferably separately analyzed to detect value changes therein in another slightly different manner, which is preferably identical to that illustrated in FIG. 10H and represented by FIG. 11F, but carried out in an opposite time direction and subsequently reversed. As in the example of FIGS. 10H and 11F, each such change is indicated together with its sign and the time duration between changes is ignored. A result of this compression operation is shown in FIG. 10I, where the abscissa indicates the total number of changes both in the X and the Y velocity components, irrespective of their sign and irrespective of whether such changes took place in the X velocity component or in the Y velocity component. A digital representation of the information contained in FIG. 10I appears in FIG. 11H.

It is thus appreciated that comparing the diagrams of FIGS. 10F and 10I, it is seen that the differences are in the indexing and possibly also in information content. Whereas in FIG. 10F, the index count increases only with each value change in the X or Y velocity component to which each diagram relates, in FIG. 10I, in contrast, the index count increases with each value change in either the X or Y velocity component. The information content may vary because FIG. 10I is constructed in an opposite time direction from FIG. 10F, although it is presented in the same time direction.

The information appearing in FIG. 11H is preferably binary encoded, in a partially overlapping manner, preferably employing the encoding matrix appearing in FIG. 11J. A matrix indicating the binary code corresponding to the X and Y components shown in FIG. 10I, appears in FIG. 11I.

The four outputs represented in FIGS. 11D, 11E, 10G & 11I are preferably provided to identification processing circuitry 554 (FIG. 5) for identification processing as described hereinbelow with reference to FIG. 6G.

Figure 6G:
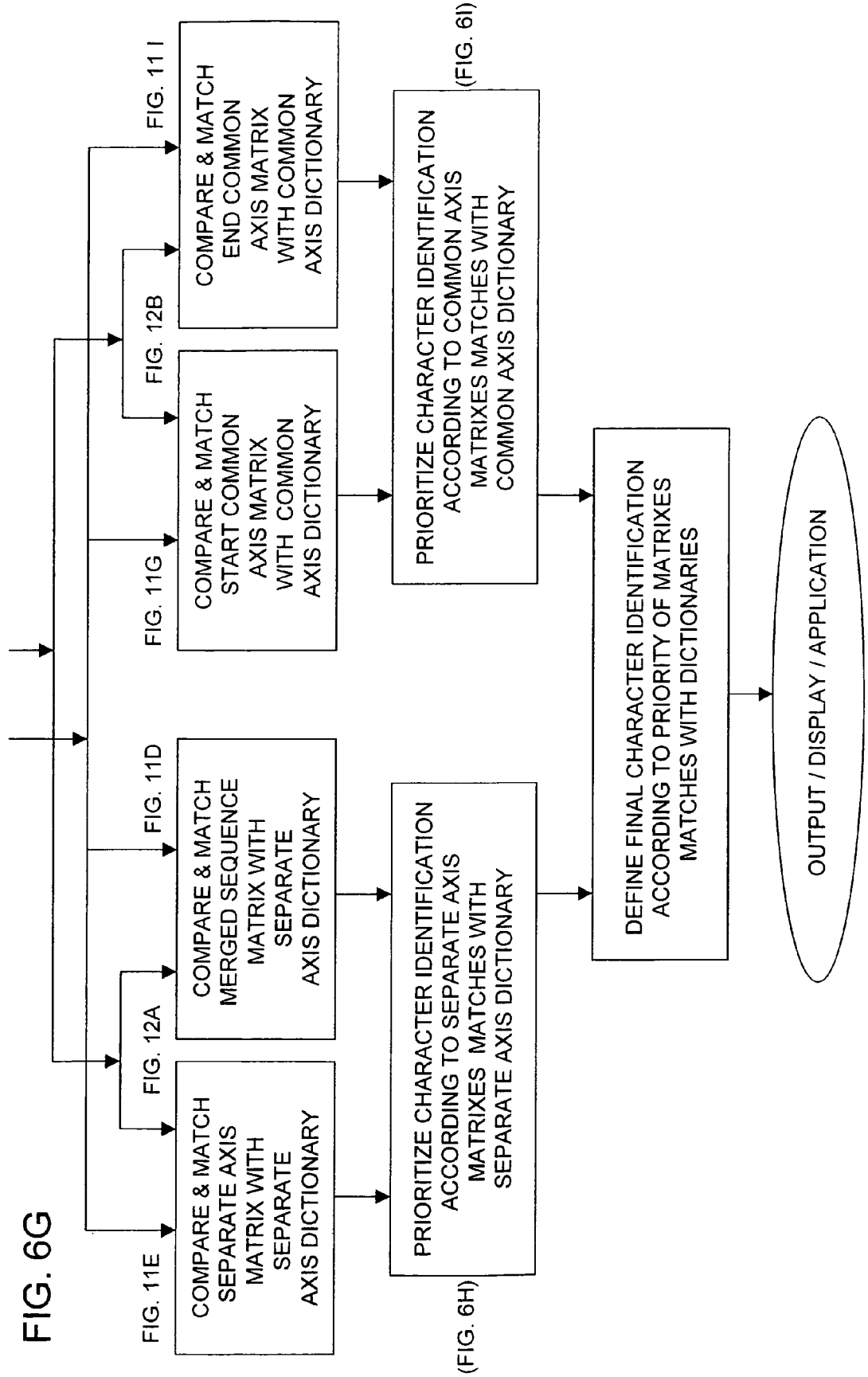

Reference is now made to FIG. 6G, which illustrates a preferred embodiment of identification processing, such as that carried out by identification circuitry 554 (FIG. 5) based on inputs received from velocity compression circuitry 552 (FIG. 5). The outputs of velocity compression circuitry 552, as exemplified in FIGS. 10F, 10G, 10H & 10I.

It is a particular feature of the present invention that the outputs of velocity compression circuitry 552, as exemplified in FIGS. 10F, 10G, 10H & 10I. which serve as inputs to the identification circuitry 554 appear in a relatively simple form which is relatively easy, simple and quick to process. This may be appreciated from a consideration of FIGS. 11D, 11E, 11G, and 11I which illustrate preferred different alternative two-dimensional matrices representing the information contained in the input to velocity compression circuitry 552, as exemplified FIGS. 8B, and 10A.

It is further appreciated that the output of dictionary preferably comprises a similarly organized two-dimensional matrix, an exemplary one of which appears in FIG. 12, for each motion or character that it is sought to identify. The identification circuitry 554 is operative to compare the various input matrices represented by FIGS. 11D, 11E, 11G, and 11I with the various dictionary matrices represented by FIG. 12 in order to achieve identification.

Figure 6H:
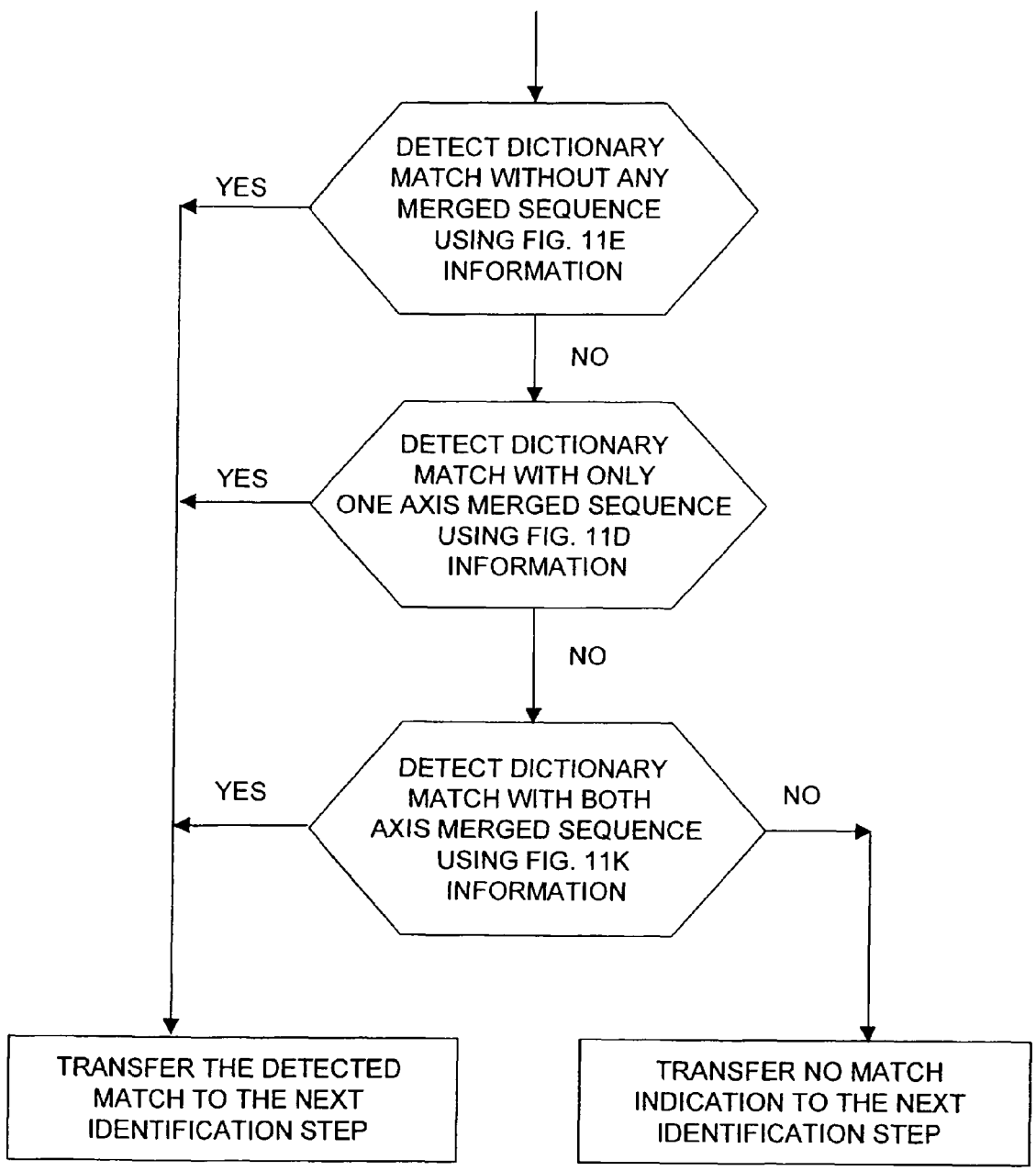
Figure 6I:
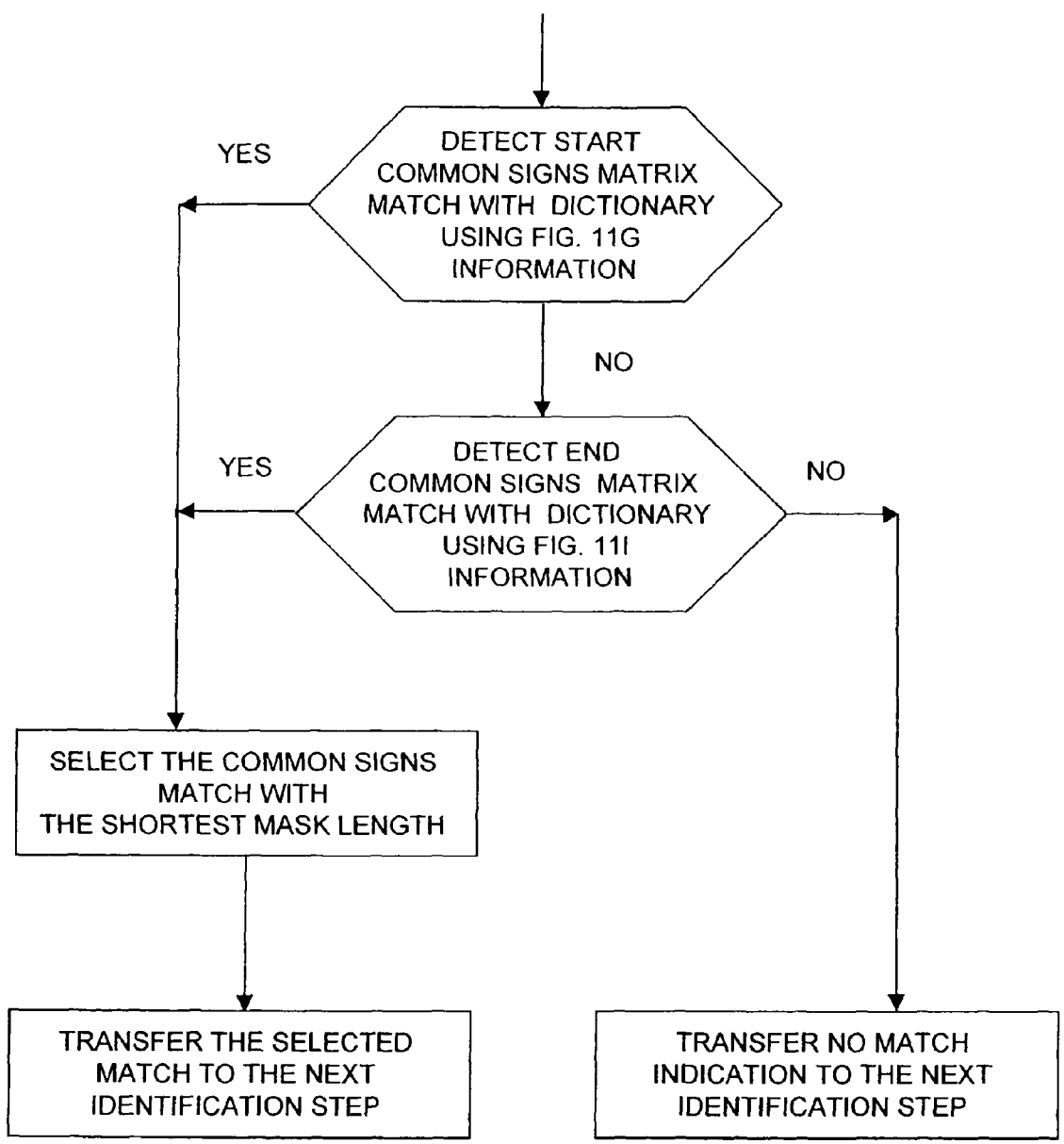

The functionality of identification circuitry 554 is now described with reference to FIG. 6G. In FIGS. 6G, 6H and 6I described hereinbelow and in FIG. 6F described hereinabove, the information related to the velocity compression 552 (FIG. 5) output and the information related to the dictionary 556 (FIG. 5) are preferably exemplified by binary codes. However, it is appreciated that other code schemes may represent this information and may serve for implementation of the steps and functionalities of the identification and recognition processes.

Referring now to FIG. 6G, it is seen that the information relating to the X and Y components, represented in FIG. 11E, is preferably compared and matched with binary information received from binary code dictionary 556 (FIG. 5), which binary information is keyed by the dictionary 556 to individual alphanumeric symbols. A typical input for this case received from binary code dictionary 556 appears in FIG. 12A.

It is also seen that the information relating to the X and Y components, represented in FIG. 11D, is preferably compared and matched with the binary information received from binary code dictionary 556 (FIG. 5). The relevant part of the dictionary for this case preferably includes 3 fields:

Motion direction signs binary code, as exemplified in FIG. 11C;

Merger code, as exemplified in FIG. 11B, at the right side thereof; and

Alphanumeric character identification field, as exemplified in FIGS. 12A and 12B at the right sides thereof.

The motion direction signs binary code is described hereinabove with reference to FIGS. 6F, 11D and 11E.

The merger code is preferably a two bit binary code, one bit for the X axis and one bit for the Y axis. The code "1" indicates that the values sequences for a given axis were merged as described hereinabove with reference to FIGS. 6F, 10G, 11B and 11D. The code "0" indicates that the values sequences for a given axis were not merged as described hereinabove with reference to FIGS. 6F, 10F, 11A and 11E. FIG. 11K exemplified the case of both merger code bits are "1" indicates that the values sequences for both X axis and Y axis were merged.

The alphanumeric character identification field is preferably a 6 bit code which define the character set. Each specific character is represented by unique expression of this code. For supporting character sets having more than 64 characters this field may be extended.

Should the outputs of both comparing and matching procedures, based respectively on the inputs represented by FIGS. 11D and 11E indicate the same alphanumeric character, an output is provided to final character identification functionality.

Should, however, the outputs of the comparing and matching procedures based on inputs represented by FIGS. 11D and 11E not indicate the same alphanumeric character, a prioritization procedure takes place, wherein typically the procedure based on the information represented in FIG. 11E takes precedence over that based on the information represented in FIG. 11D, as indicated in FIG. 6H.

As also seen in FIG. 6H the procedure based on the information represented in FIG. 11D typically takes precedence over the procedure based on information represented in FIG. 11K.

It may be appreciated from a consideration of FIG. 6H that dictionary matches having no merged sequences are generally given priority over dictionary matches having merged sequences for only one axis and that both of the foregoing dictionary matches are given priority over dictionary matches having merged sequences for both axes.

Other types of prioritization may additionally or alternatively be employed.

As also seen in FIG. 6G, the information relating to the X and Y components, represented in FIG. 11G, is preferably compared and matched with binary information received from binary code dictionary 556 (FIG. 5) which is keyed to individual alphanumeric symbols. A typical input for this case received from binary code dictionary 556 appears in FIG. 12B.

It is also seen that the information relating to the X and Y components, represented in FIG. 11I, is preferably compared and matched with the binary information received from binary code dictionary 556 (FIG. 5) which is keyed to individual alphanumeric symbols, exemplified in FIG. 12B.

The relevant part of the dictionary for this case preferably includes four fields:

Motion direction signs binary code, as exemplified in FIG. 11J;

Mask length code, as exemplified in FIG. 12B, near the right side thereof;

Mask position code, as exemplified in FIGS. 12B and 12D to the right of the mask length code; and Alphanumeric character identification field, as exemplified in FIGS. 12A, 12B and 12D at the right sides thereof.

The motion direction signs binary code is described hereinabove with reference to FIGS. 6F, 11G and 11I.

The mask length code is preferably a 6 bit code that describe the length of a mask which indicates bits which do not participate in the compare and match procedures at the right side of FIG. 6G.

The mask position code is preferably a two bit binary code, a "1" at the one bit indicating the that the mask starts from the left and a "1" at the other bit indicating the mask starts from the right. A code "0" at both bits indicates that no mask is present.

The alphanumeric character identification field is preferably a 6 bit code which defines the character set: Each specific character is represented by unique combination of this code. For supporting character sets with more than 64 characters, this field may be extended.

In accordance with a preferred embodiment of the present invention, the prerequisites for matching between a matrix and a dictionary word are that the mask position code value should be identical and the mask length of the dictionary word should be equal or greater to the length of a sequence of zeros in the matrix.

Should the outputs of both comparing and matching procedures, based respectively on the inputs represented by FIGS. 11G and 11I indicate the same alphanumeric character, an output is provided to final character identification functionality.

Should, however, the outputs of the comparing and matching procedures based on inputs represented by FIGS. 11G and 11I not indicate the same alphanumeric character, a prioritization procedure takes place, wherein typically the procedure based on the information represented in FIG. 11G takes precedence over that based on the information represented in FIG. 11I. Other types of prioritization may additionally or alternatively be employed.

In both the FIG. 11G and 11I cases, matches having the shortest mask length have priority. Other types of prioritization may additionally or alternatively be employed.

The final character identification functionality receives the inputs resulting from the prioritization procedures indicating alphanumeric characters. If there is agreement between the inputs, the resulting alphanumeric symbol is output. In the absence of agreement typically the alphanumeric symbol indicated by the procedure based on the information represented in FIG. 11D or 11E takes precedence over that based on the information represented in FIG. 11G or 11I. Other types of prioritization may additionally or alternatively be employed.

It is appreciated that for a specific alphanumeric symbol it may be sufficient to include in the dictionary 556 (FIG. 5) at least one of the two typical matrices representations exemplified by FIGS. 12A and 12B. In case that one representation is absence for a specific alphanumeric symbol, the comparing and matching procedures related to this representation will yield no match and the identification process will continue according the description of FIG. 6G hereinabove.

It also is appreciated that it may be sufficient to implement only part of the four velocity compression 552 (FIG. 5) processing results as exemplified in FIGS. 10F, 10G, 10H & 10I for an identification of a specific character set or a specific symbol set.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

The invention claimed is:

1. Apparatus for hand motion tracking comprising:
 a hand-held device comprising at least one accelerometer providing an acceleration indicating output;
 computation circuitry receiving said acceleration indicating output, discarding user specific components therein by eliminating samples and providing a non-user specific output; and
 a hand motion tracker receiving said non-user specific output and providing a tracking output indication.

2. Apparatus according to claim 1 and wherein said computation circuitry provides said non-user specific output by indicating value changes and ignoring time durations between said changes.

3. Apparatus according to claim 1 and wherein said computation circuitry provides an output including motion direction signs.

4. Apparatus according to claim 1 and wherein said computation circuitry discards said user specific components by employing a time indication.

5. Apparatus according to claim 1 and wherein said acceleration indicating output includes at least one of a digital output and a filtered output.

6. Apparatus according to claim 5 and wherein said digital output is provided by at least one of data acquisition circuitry, a digital acceleration sensor and an A-D converter.

7. Apparatus according to claim 1 and wherein said computation circuitry is operative to employ an abscissa indicating number of changes to provide said non-user specific output.

8. A method for hand motion tracking comprising:
 providing an acceleration indicating output from a hand-held device;
 receiving said acceleration indicating output, discarding user specific components by eliminating samples therein and providing a non-user specific output; and
 receiving said non-user specific output and providing a tracking output indication.

9. A method according to claim 8 and wherein said providing said non-user specific output includes indicating value changes and ignoring time durations between said changes.

10. A method according to claim 8 and wherein said discarding said user specific components comprises discarding said user specific components by employing a time indication.

11. A method according to claim 8 and wherein said providing an acceleration indicating output includes providing at least one of a digital output and a filtered output.

12. A method according to claim 8 and wherein said providing said non-user specific output comprises employing an abscissa indicating time.

13. Apparatus for hand motion tracking comprising:
 a hand-held device comprising at least one accelerometer providing an acceleration indicating output;
 computation circuitry including minimum motion point identification functionality employing said acceleration indicating output, identifying minimum motion points and providing a minimum motion point identification output; and
 hand motion tracking circuitry employing said acceleration indication output and said minimum motion point identification output for providing a hand motion tracking output indication.

14. Apparatus according to claim 13 and wherein said minimum motion point identification functionality performs detection of at least one last intentional motion sample.

15. Apparatus according to claim 13 and wherein said minimum motion point identification functionality employs an examination of motion samples.

16. Apparatus according to claim 13 and wherein said minimum motion point identification functionality performs a sequential operation.

17. Apparatus according to claim 13 and wherein said minimum motion point identification functionality operates along a time axis.

18. Apparatus according to claim 13 and wherein said minimum motion point identification functionality performs determination of an average of motion samples.

19. Apparatus according to claim 18 and wherein said minimum motion point identification functionality comprises examining a variation from said average.

20. Apparatus according to claim 13 and wherein said minimum motion point identification functionality performs determination of at least one time location.

21. A method for hand motion tracking comprising:
 providing an acceleration indicating output of a hand-held device comprising at least one accelerometer;
 employing said acceleration indicating output, identifying minimum motion points and providing a minimum motion point identification output; and
 employing said minimum motion point identification output and additionally employing said acceleration indication output for providing a hand motion tracking output indication.

22. A method according to claim 21 and wherein at least one of said employing said acceleration indicating output and said identifying minimum motion points comprises determination of at least one last intentional motion sample.

23. A method according to claim 21 and wherein at least one of said employing said acceleration indicating output and said identifying minimum motion points comprises employing examination of motion samples.

24. A method according to claim 21 and wherein at least one of said employing said acceleration indicating output and said identifying minimum motion points operates along a time axis.

25. A method according to claim 21 and wherein at least one of said employing said acceleration indicating output and said identifying minimum motion points comprises determination of an average of a few samples.

26. A method according to claim 25 and wherein at least one of said employing said acceleration indicating output and said identifying minimum motion points comprises sequentially examining a variation from said average.

27. A method according to claim 21 and wherein at least one of said employing said acceleration indicating output and said identifying minimum motion points comprises determination of at least one time location.

28. Apparatus for hand motion tracking comprising:
a hand-held device comprising at least one accelerometer providing an acceleration indicating output;
computation circuitry receiving said acceleration indicating output, discarding user specific components therein and providing a non-user specific output by indicating value changes and ignoring time durations between said changes; and
a hand motion tracker receiving said non-user specific output and providing a tracking output indication.

29. Apparatus according to claim 28 and wherein said computation circuitry discards said user specific components of said acceleration indicating output by eliminating samples.

30. Apparatus according to claim 28 and wherein said computation circuitry provides an output including motion direction signs.

31. Apparatus according to claim 28 and wherein said computation circuitry discards said user specific components by employing a time indication.

32. Apparatus according to claim 28 and wherein said acceleration indicating output includes at least one of a digital output and a filtered output.

33. Apparatus according to claim 32 and wherein said digital output is provided by at least one of data acquisition circuitry, a digital acceleration sensor and an A-D converter.

34. Apparatus according to claim 28 and wherein said computation circuitry is operative to employ an abscissa indicating number of changes to provide said non-user specific output.

35. Apparatus for hand motion tracking comprising:
a hand-held device comprising at least one accelerometer providing an acceleration indicating output;
computation circuitry receiving said acceleration indicating output, discarding user specific components therein and providing a non-user specific output including motion direction signs; and
a hand motion tracker receiving said non-user specific output and providing a tracking output indication.

36. Apparatus according to claim 35 and wherein said computation circuitry discards said user specific components of said acceleration indicating output by eliminating samples.

37. Apparatus according to claim 35 and wherein said computation circuitry provides said non-user specific output by indicating value changes and ignoring time durations between said changes.

38. Apparatus according to claim 35 and wherein said computation circuitry discards said user specific components by employing a time indication.

39. Apparatus according to claim 35 and wherein said acceleration indicating output includes at least one of a digital output and a filtered output.

40. Apparatus according to claim 39 and wherein said digital output is provided by at least one of data acquisition circuitry, a digital acceleration sensor and an A-D converter.

41. Apparatus according to claim 35 and wherein said computation circuitry is operative to employ an abscissa indicating number of changes to provide said non-user specific output.

42. A method for hand motion tracking comprising:
providing an acceleration indicating output from a hand-held device;
receiving said acceleration indicating output, discarding user specific components therein and providing a non-user specific output, wherein providing a non-user specific output includes indicating value changes and ignoring time durations between said changes; and
receiving said non-user specific output and providing a tracking output indication.

43. A method according to claim 42 and wherein said discarding said user specific components includes eliminating samples.

44. A method according to claim 42 and wherein said discarding said user specific components comprises discarding said user specific components by employing a time indication.

45. A method according to claim 42 and wherein said providing an acceleration indicating output includes providing at least one of a digital output and a filtered output.

46. A method according to claim 42 and wherein said providing said non-user specific output comprises employing an abscissa indicating time.

47. Apparatus for hand motion tracking comprising:
a hand-held device comprising at least one accelerometer providing an acceleration indicating output;
computation circuitry operative to employ an abscissa indicating number of changes to provide non-user specific output, receiving said acceleration indicating output, discarding user specific components therein and providing a non-user specific output; and
a hand motion tracker receiving said non-user specific output and providing a tracking output indication.

48. A method for hand motion tracking comprising:
providing an acceleration indicating output from a hand-held device;
receiving said acceleration indicating output, discarding user specific components therein and providing a non-user specific output comprising employing an abscissa indicating time; and
receiving said non-user specific output and providing a tracking output indication.

* * * * *